(12) United States Patent
Fernando et al.

(10) Patent No.: US 9,154,243 B2
(45) Date of Patent: *Oct. 6, 2015

(54) RECEIVER CALIBRATION WITH LO SIGNAL FROM INACTIVE RECEIVER

(71) Applicant: QUALCOMM Incorporated, San Diego, CA (US)

(72) Inventors: Udara C. Fernando, San Diego, CA (US); Li-Chung Chang, Irvine, CA (US); Vijay K. Chellappa, San Diego, CA (US); Frederic Bossu, San Diego, CA (US); Ketan Humnabadkar, San Diego, CA (US); Gurkanwal Singh Sahota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,691

(22) Filed: Feb. 26, 2013

(65) Prior Publication Data
US 2014/0171001 A1    Jun. 19, 2014

Related U.S. Application Data

(60) Provisional application No. 61/738,258, filed on Dec. 17, 2012.

(51) Int. Cl.
*H04B 17/00* (2006.01)
*H04B 17/21* (2015.01)
*H04B 1/06* (2006.01)

(52) U.S. Cl.
CPC ............ *H04B 17/0062* (2013.01); *H04B 17/21* (2015.01)

(58) Field of Classification Search
CPC ....................................... H04B 17/00
USPC .................................... 455/226.1–226.2, 132
See application file for complete search history.

(56) References Cited

U.S. PATENT DOCUMENTS

| 7,027,833 | B1 | 4/2006 | Goodman |
| 7,035,617 | B2 | 4/2006 | Buer et al. |

(Continued)

FOREIGN PATENT DOCUMENTS

WO     2009003101 A2    12/2008

OTHER PUBLICATIONS

Hashemi H., et al., "A 24-GHz SiGe phased-array receiver—LO phase-shifting approach," IEEE Transactions on Microwave Theory and Techniques, vol. 53 (2), Feb. 2005, pp. 614-626.

(Continued)

*Primary Examiner* — Lee Nguyen
(74) *Attorney, Agent, or Firm* — Ramin Mobarhan

(57) ABSTRACT

Techniques for calibrating a receiver based on a local oscillator (LO) signal from another receiver are disclosed. In an exemplary design, an apparatus (e.g., a wireless device or an integrated circuit) includes first and second local oscillator (LO) generators. The first LO generator generates a first LO signal used by a first receiver for frequency downconversion. The second LO generator generates a second LO signal used by a second receiver for frequency downconversion in a first operating mode. The second LO signal is used to generate a test signal for the first receiver in a second operating mode. The second LO signal may be provided as the test signal or may be amplitude modulated with a modulating signal to generate the test signal. The test signal may be used to calibrate residual sideband (RSB), second order input intercept point (IIP2), receive path gain, etc.

19 Claims, 17 Drawing Sheets

(56) References Cited

U.S. PATENT DOCUMENTS

| | | | |
|---|---|---|---|
| 7,084,808 B2 * | 8/2006 | Ratzel et al. | 342/173 |
| 7,847,613 B1 | 12/2010 | Samavati | |
| 7,911,269 B2 | 3/2011 | Yang et al. | |
| 8,139,670 B1 | 3/2012 | Son et al. | |
| 8,204,154 B2 | 6/2012 | Min et al. | |
| 8,204,451 B1 | 6/2012 | Kheirkhahi et al. | |
| 8,204,467 B2 | 6/2012 | Tillman et al. | |
| 8,285,241 B2 | 10/2012 | Mirzaei et al. | |
| 8,774,745 B2 | 7/2014 | Leung et al. | |
| 2006/0009180 A1 | 1/2006 | Xu et al. | |
| 2006/0068746 A1 | 3/2006 | Feng et al. | |
| 2006/0121864 A1 | 6/2006 | Rodgers et al. | |
| 2008/0013654 A1 | 1/2008 | Rick et al. | |
| 2008/0057901 A1 | 3/2008 | Stoll et al. | |
| 2009/0088124 A1 | 4/2009 | Schuur et al. | |
| 2011/0001539 A1 | 1/2011 | Choksi et al. | |
| 2012/0299633 A1 | 11/2012 | Kim et al. | |
| 2013/0102316 A1 | 4/2013 | Ngai et al. | |
| 2013/0222041 A1 | 8/2013 | Vavelidis | |
| 2014/0295783 A1 | 10/2014 | Leung et al. | |

OTHER PUBLICATIONS

International Search Report and Written Opinion—PCT/US2013/075882—ISA/EPO—Mar. 27, 2014.

Stempox, "CPU Governors Explained" DroiDevs, Sep. 14, 2012, 6pgs.

Rabieirad L., et al., "A dual-mode programmable distributed amplifier/mixer", Microwave Symposium Digest, 2009, MTT '09, IEEE MTT-S International, IEEE, Piscataway, NJ, USA, Jun. 7, 2009, pp. 581-584, XP031490585, ISBN: 978-1-4244-2803-8.

* cited by examiner

RECEIVER CALIBRATION WITH LO SIGNAL FROM INACTIVE RECEIVER

I. CLAIM OF PRIORITY UNDER 35 U.S.C. §119

The present application for patent claims priority to Provisional U.S. Application Ser. No. 61/738,258, entitled "RECEIVER CALIBRATION WITH LO SIGNAL FROM INACTIVE RECEIVER," filed Dec. 17, 2012, assigned to the assignee hereof, and expressly incorporated herein by reference.

BACKGROUND

I. Field

The present disclosure relates generally to electronics, and more specifically to techniques for generating test signals for calibration of receivers.

II. Background

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a transmit local oscillator (LO) signal with data to obtain a modulated signal, amplify the modulated signal to obtain an output radio frequency (RF) signal having the proper output power level, and transmit the output RF signal via an antenna to a base station. For data reception, the receiver may obtain a received RF signal via the antenna, amplify and downconvert the received RF signal with a receive LO signal, and process the downconverted signal to recover data sent by the base station. An LO signal is a periodic signal at a target frequency and may be used for frequency conversion.

A wireless device may include a number of receivers, and each receiver may include various circuits. The circuits in each receiver may be designed to meet specifications but may have performance that can vary widely due to variations in manufacturing, temperature, power supply voltage, etc. It may be desirable to test/calibrate these circuits in order to ensure good performance even in the presence of these variations.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Techniques for calibrating a receiver with an LO signal from another receiver or another signal source are disclosed herein. The techniques may be used for various electronic devices such as wireless communication devices (e.g., cellular phones, smartphones, etc.) tablets, personal digital assistants (PDAs), handheld devices, wireless modems, laptop computers, smartbooks, netbooks, cordless phones, wireless local loop (WLL) stations, Bluetooth devices, consumer electronic devices, etc. For clarity, the use of the techniques for a wireless communication device is described below.

Figure 1:
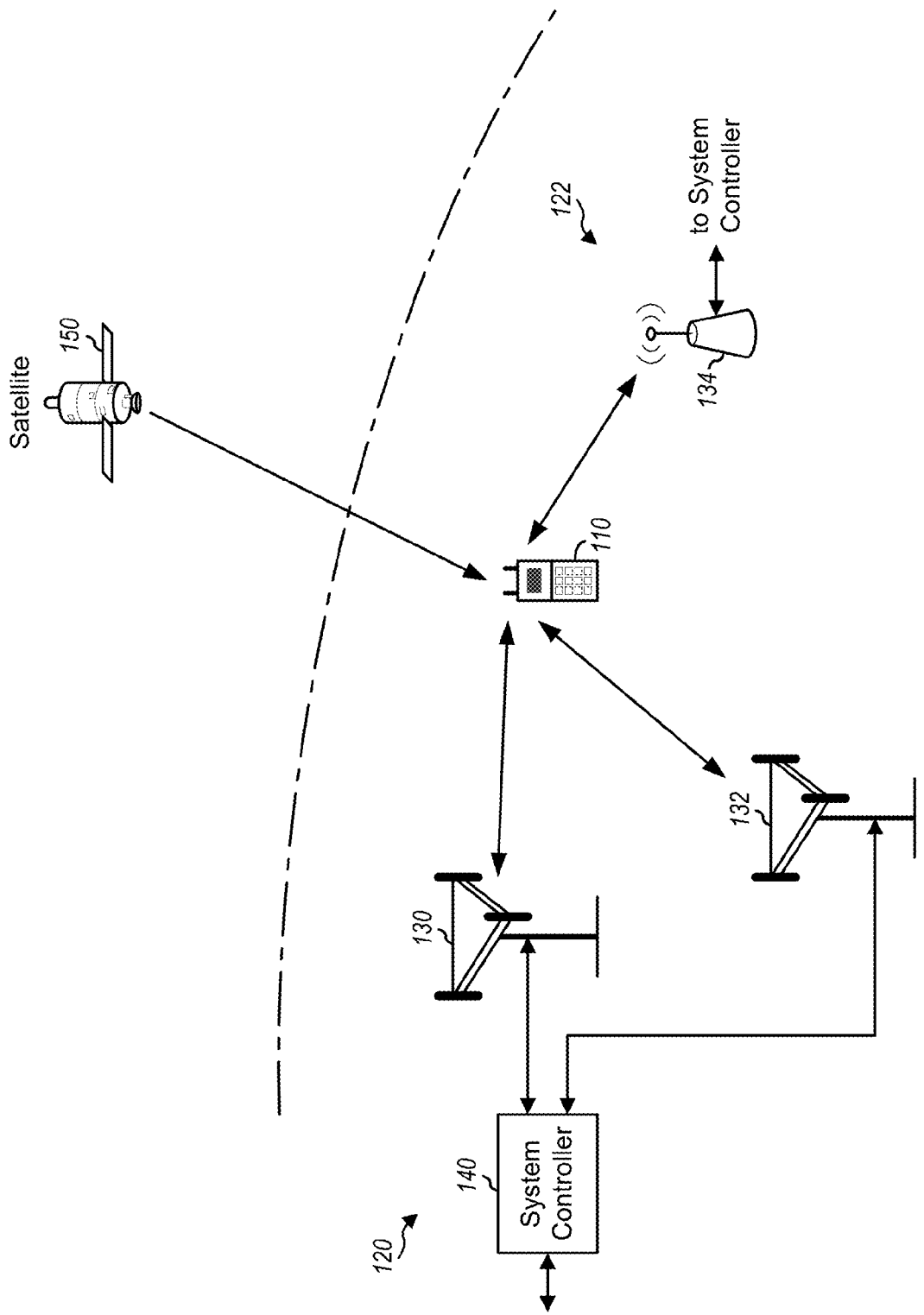
FIG. 1 shows a wireless device communicating with different wireless systems.

FIG. 1 shows a wireless device 110 communicating with wireless communication systems 120 and 122. Each wireless system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. For simplicity, FIG. 1 shows wireless system 120 including two base stations 130 and 132 and one system controller 140, and wireless system 122 including one base station 134. In general, a wireless system may include any number of base stations and any set of network entities. A base station may also be referred to as a Node B, an evolved Node B (eNB), an access point, etc.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 120 and/or 122. Wireless device 110 may also receive signals from broadcast stations, signals from satellites (e.g., a satellite 150) in one or more global navigation satellite systems (GNSS), etc. Wireless device 110 may support one or more radio technologies for wireless communication such as LTE, WCDMA, CDMA 1X, EVDO, TD-SCDMA, GSM, 802.11, etc.

Wireless device 110 may be able to operate in low-band (LB) covering frequencies lower than 1000 megahertz (MHz), mid-band (MB) covering frequencies from 1000 MHz to 2300 MHz, and/or high-band (HB) covering frequencies higher than 2300 MHz. For example, low-band may cover 698 to 980 MHz, mid-band may cover 1475 to 2170 MHz, and high-band may cover 2300 to 2690 MHz and 3400 to 3800 MHz. Low-band, mid-band, and high-band refer to three groups of bands (or band groups), with each band group including a number of frequency bands (or simply, "bands"). Each band may cover up to 200 MHz. LTE Release 11 supports 35 bands, which are referred to as LTE/UMTS bands and are listed in a publicly available document 3GPP TS 36.101. In general, any number of band groups may be defined. Each band group may cover any range of frequencies, which may or may not match any of the frequency ranges given above. Each band group may include any number of bands.

Wireless device 110 may support carrier aggregation, which is operation on multiple carriers. Carrier aggregation may also be referred to as multi-carrier operation. A carrier may refer to a range of frequencies used for communication and may be associated with certain characteristics. For example, a carrier may be associated with system information and/or control information describing operation on the carrier. A carrier may also be referred to as a component carrier (CC), a frequency channel, a cell, etc. A band may include one or more carriers. Each carrier may cover up to 20 MHz in LTE. Wireless device 110 may be configured with up to 5 carriers in one or two bands in LTE Release 11.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2:
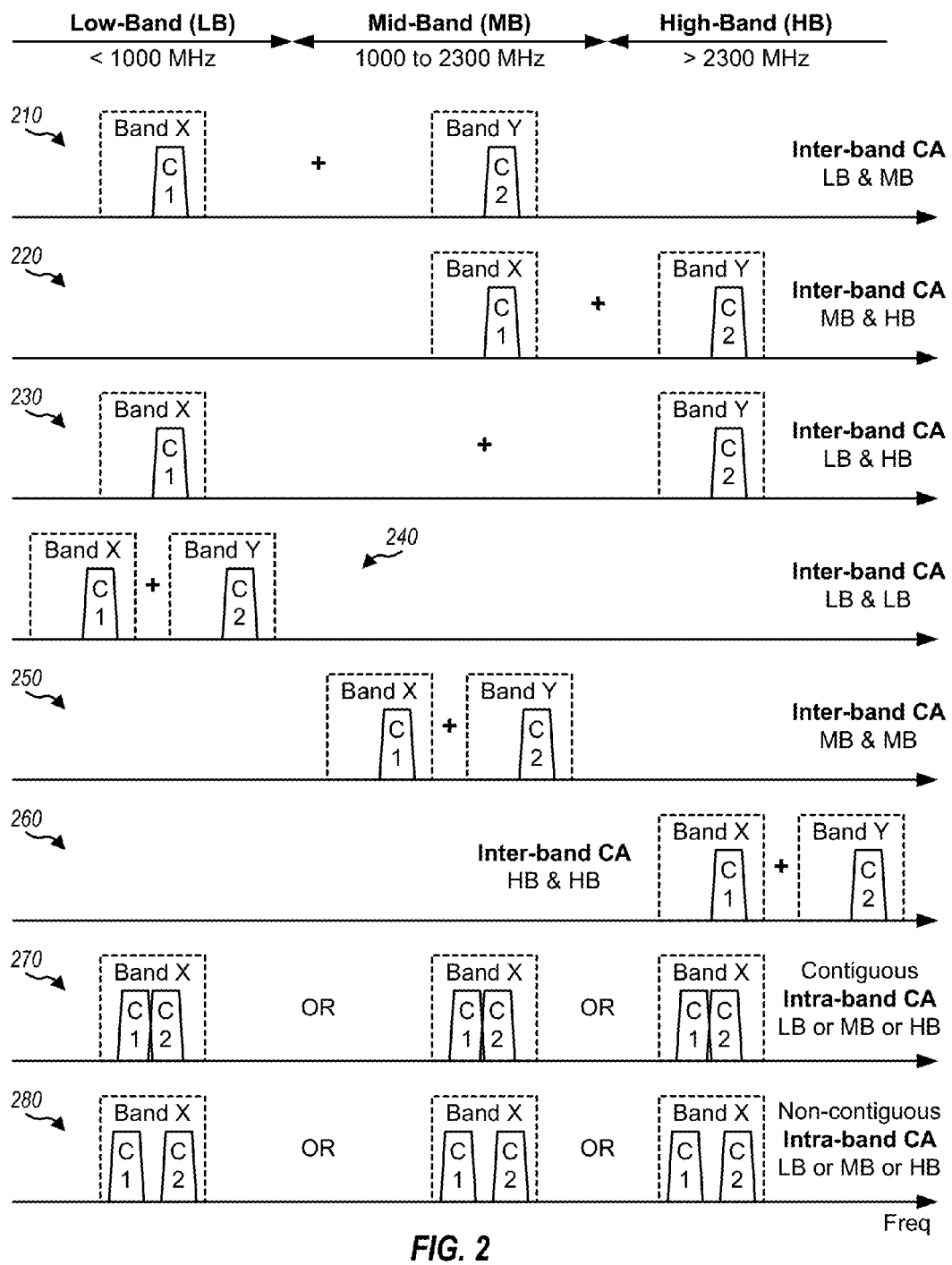
FIG. 2 shows various carrier aggregation scenarios.

FIG. 2 shows various CA scenarios that may be supported by wireless device 110. For simplicity, FIG. 2 shows wireless device 110 being configured with only one carrier in a band for inter-band CA. In general, wireless device 110 may be configured with one or more carriers in a given band.

Scenario 210 covers inter-band CA with one carrier C1 in band X in low-band and one carrier C2 in band Y in mid-band being configured for wireless device 110. Scenario 220 covers inter-band CA with one carrier C1 in band X in mid-band and one carrier C2 in band Y in high-band being configured for wireless device 110. Scenario 230 covers inter-band CA with one carrier C1 in band X in low-band and one carrier C2 in band Y in high-band being configured for wireless device 110.

Scenario 240 covers inter-band CA with one carrier C1 in band X in low-band and one carrier C2 in band Y also in low-band being configured for wireless device 110. Scenario 250 covers inter-band CA with one carrier C1 in band X in mid-band and one carrier C2 in band Y also in mid-band being configured for wireless device 110. Scenario 260 covers inter-band CA with one carrier C1 in band X in high-band and one carrier C2 in band Y also in high-band being configured for wireless device 110.

Scenario 270 covers contiguous intra-band CA with two adjacent carriers C1 and C2 in band X in low-band, or mid-band, or high-band being configured for wireless device 110. Scenario 280 covers non-contiguous intra-band CA with two non-adjacent carriers C1 and C2 in band X in low-band, or mid-band, or high-band being configured for wireless device 110.

FIG. 2 shows some examples of carrier aggregation. Carrier aggregation may also be supported for other combinations of bands and band groups.

Wireless device 110 may concurrently receive multiple transmitted signals at different frequencies. These multiple transmitted signals may be sent by one or more base stations on multiple carriers at different frequencies for carrier aggregation. These multiple transmitted signals may also be sent by different base stations for coordinated multi-point (CoMP) transmission, handover, etc. These multiple transmitted signals may also be sent by base stations in different wireless systems for concurrent services such as voice/data, or data/data, or voice/voice, etc. For example, wireless device 110 may support dual SIM/dual standby (DSDS) and/or dual SIM/dual-active (DSDA) and may be able to concurrently communicate with multiple wireless systems such as TD-SCDMA and GSM systems, or LTE and GSM systems, or CDMA and GSM systems, etc.

Figure 3:
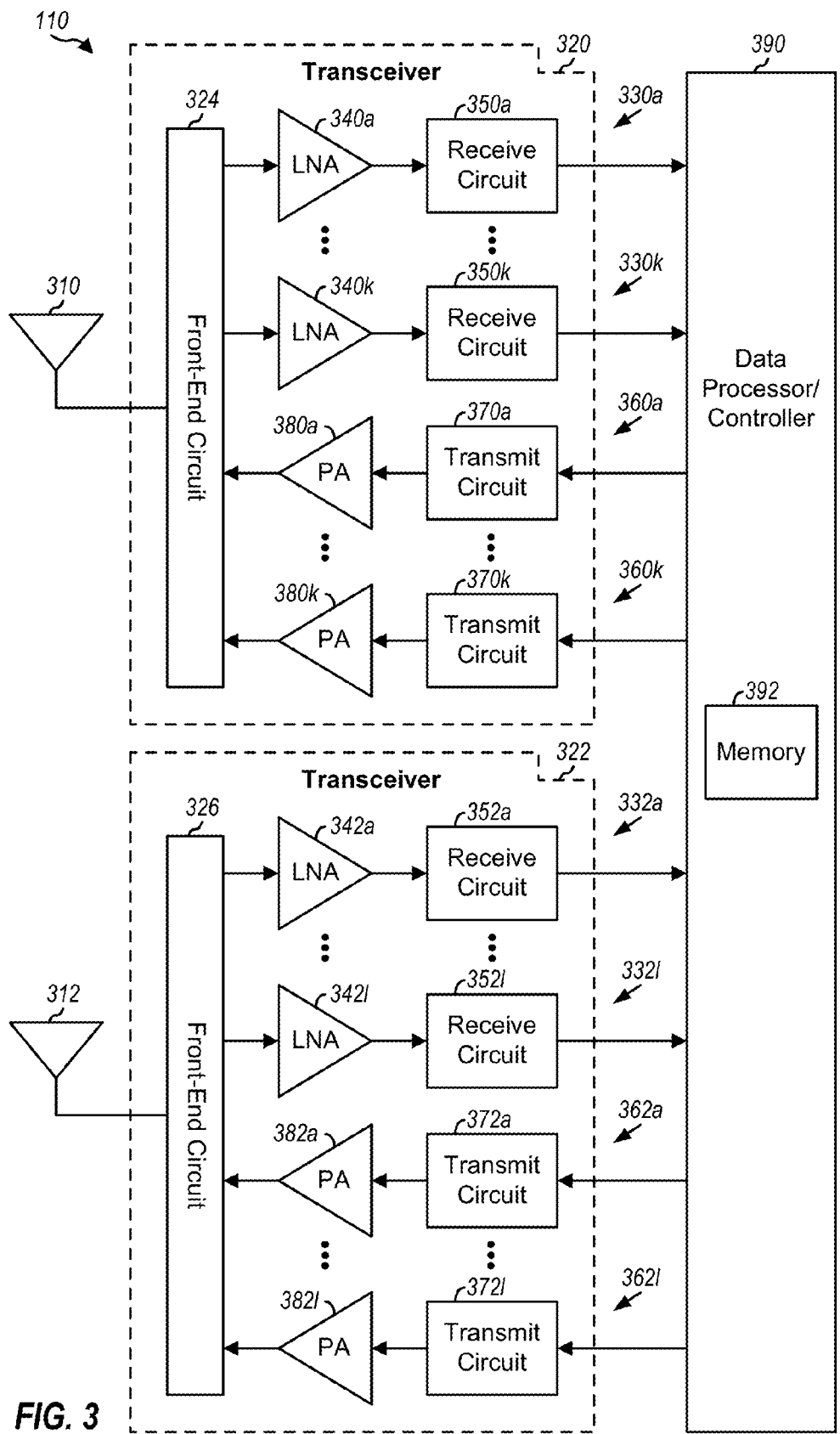
FIG. 3 shows a block diagram of the wireless device in FIG. 1.

FIG. 3 shows a block diagram of an exemplary design of wireless device 110 in FIG. 1. In this exemplary design, wireless device 110 includes a transceiver 320 coupled to a primary antenna 310, a transceiver 322 coupled to a secondary antenna 312, and a data processor/controller 390. Transceiver 320 includes multiple (K) receivers 330a to 330k and multiple (K) transmitters 360a to 360k to support multiple frequency bands, multiple radio technologies, carrier aggregation, etc. Transceiver 322 includes multiple (L) receivers 332a to 332l and multiple (L) transmitters 362a to 362l to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 3, each receiver 330 includes an LNA 340 and a receive circuit 350. For data reception, antenna 310 receives signals from base stations and/or other transmitter stations and provides a received RF signal. A front-end circuit 324 receives the received RF signal from antenna 310 and provides one or more input RF signals (e.g., for one or more bands) to one or more selected receivers. Front-end circuit 324 may include switches, duplexers, diplexers, transmit filters, receive filters, matching circuits, etc. The description below assumes that one input RF signal is provided to receiver 330a, which is the selected receiver. Within receiver 330a, an LNA 340a amplifies the input RF signal and provides an amplified RF signal. A receive circuit 350a downconverts the amplified RF signal from RF to baseband, filters and amplifies the downconverted signal, and provides an input baseband signal to data processor 390. Receive circuit 350a may include mixers, filters, amplifiers, matching circuits, an oscillator, a local oscillator (LO) generator, a phase locked loop (PLL), etc. Each of remaining receivers 330 and 332 may operate in similar manner as receiver 330a.

In the exemplary design shown in FIG. 3, each transmitter 360 includes a transmit circuit 370 and a power amplifier (PA) 380. For data transmission, data processor 390 processes (e.g., encodes and modulates) data to be transmitted and provides one or more output baseband signals (e.g., for transmission on one or more bands) to one or more selected transmitters. The description below assumes that one output baseband signal is provided to transmitter 360a, which is the selected transmitter. Within transmitter 360a, a transmit circuit 370a amplifies, filters, and upconverts the analog output signal from baseband to RF and provides a modulated RF signal. Transmit circuit 370a may include amplifiers, filters, mixers, matching circuits, an oscillator, an LO generator, a PLL, etc. A PA 380a receives and amplifies the modulated RF signal and provides a transmit RF signal having the proper output power level. The transmit RF signal is routed through front-end circuit 324 and transmitted via antenna 310. Each of remaining transmitters 360 and 362 may operate in similar manner as transmitter 360a.

FIG. 3 shows an exemplary design of receivers 330 and 332 and transmitters 360 and 362. A receiver and a transmitter may also include other circuits not shown in FIG. 3, such as filters, matching circuits, etc. All or a portion of transceivers 320 and 322 may be implemented on one or more analog integrated circuits (ICs), RF ICs (RFICs), mixed-signal ICs, etc. For example, LNAs 340 and 342 and receive circuits 350 and 352 within transceivers 320 and 322 may be implemented on one or more RFICs. The circuits in transceivers 320 and 322 may also be implemented in other manners.

Data processor/controller 390 may perform various functions for wireless device 110. For example, data processor 390 may perform processing for data being received via receivers 330 and 332 and data being transmitted via transmitters 360 and 362. Controller 390 may control the operation of various circuits within transceivers 320 and 322. A memory 392 may store program codes and data for data processor/controller 390. Data processor/controller 390 may be implemented on one or more application specific integrated circuits (ASICs) and/or other ICs.

In general, a wireless device may include any number of receivers and any number of transmitters. The receivers and transmitters may be designed to meet specifications but may have performance that can vary widely due to variations in IC process, temperature, power supply voltage, etc. For example, the receivers and transmitters may be implemented with transistors having threshold voltage, transconductance, and/or other characteristics that may vary due to IC process variations and may impact the performance of the receivers and transmitters.

A receiver may be required to meet specifications for residual sideband (RSB). RSB is a measure of gain imbalance and/or phase imbalance between an inphase (I) signal path and a quadrature (Q) signal path in a receiver. In an ideal receiver, the I signal path should be in quadrature (or 90° out of phase) with respect to the Q signal path, and the two signal paths should have equal gain across frequency. However, I/Q imbalance typically exists between the I and Q signal paths and may include gain imbalance and/or phase error. I/Q imbalance results in RSB, which is distortion that falls on nearby frequencies.

Figure 4A:
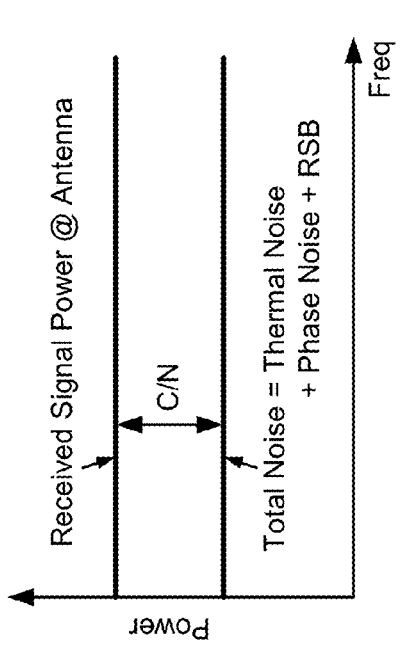
FIG. 4A shows downconversion of signals on four carriers.

FIG. 4A shows downconversion of desired signals on three carriers C1, C2 and C4 and a large jammer on carrier C3. A desired signal is a transmitted signal to be received and decoded by a wireless device. A jammer is an undesired/interfering signal having an amplitude that is much larger than that of a desired signal and located close in frequency to the desired signal. A received RF signal provided to a receiver may include the desired signals on carriers C1, C2 and C4 as well as the jammer on carrier C3. The desired signals on carriers C1, C2 and C4 may have similar received power level, and the jammer may have a much higher received power level than that of the desired signals. The received RF signal is downconverted with an LO signal at a frequency of $f_c$, which is the center frequency of the four carriers C1 to C4.

As shown in FIG. 4A, I/Q imbalance in the receiver may result in the jammer on carrier C3 causing RSB that appears on carrier C2. The RSB from the jammer acts as noise/interference to the desired signal on carrier C2, which may adversely impact the ability to decode the desired signal on carrier C2. The amplitude of the RSB is dependent on (i) the received power level of the jammer and (ii) the amount of I/Q imbalance in the receiver. The receiver has a noise floor, which may be determined by thermal noise as well as noise of circuits in the receiver. The RSB may be higher than the noise floor at the receiver. In this case, a carrier-to-noise ratio (C/N) of the desired signal on carrier C2 may be limited by the RSB due to the jammer on carrier C3.

Figure 4B:
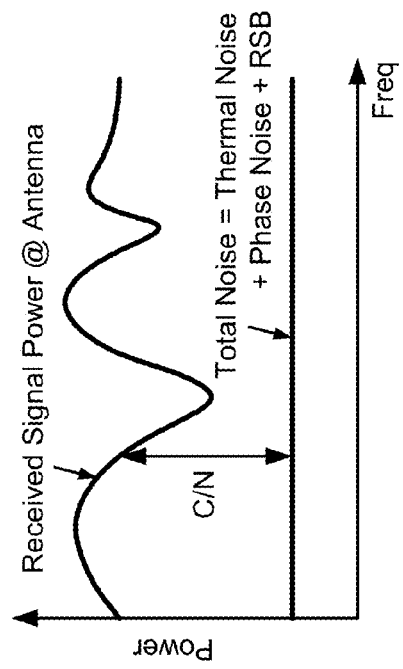
FIGS. 4B to 4D show received power versus total noise at a receiver for different operating scenarios.

FIG. 4B shows received power versus total noise at the receiver in a flat channel. The frequency response of a carrier may be flat in a static channel. C/N may be determined by the ratio of the received power of the desired signal to the total noise power.

Figure 4C:
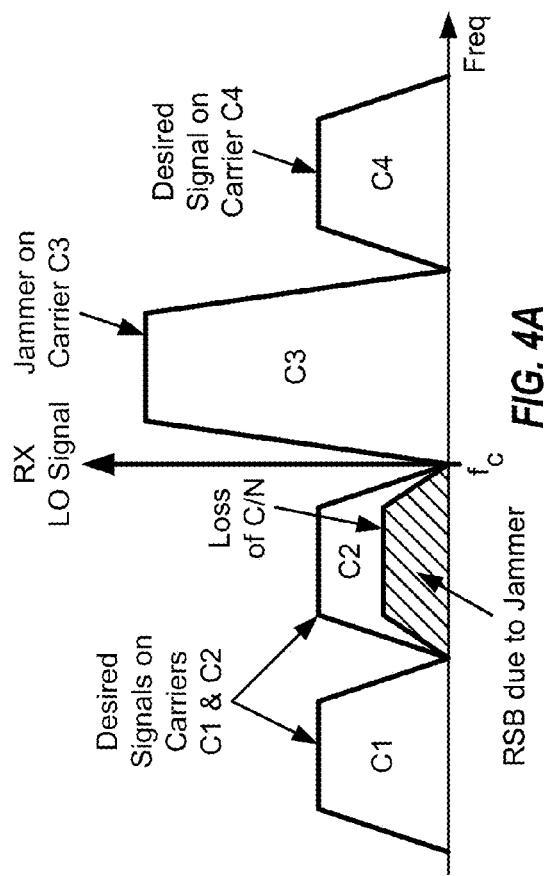

FIG. 4C shows received power versus total noise at the receiver in a faded channel. The frequency response of a carrier may vary across frequency in a faded channel. C/N may also vary across frequency and may result in a loss of throughput.

Figure 4D:
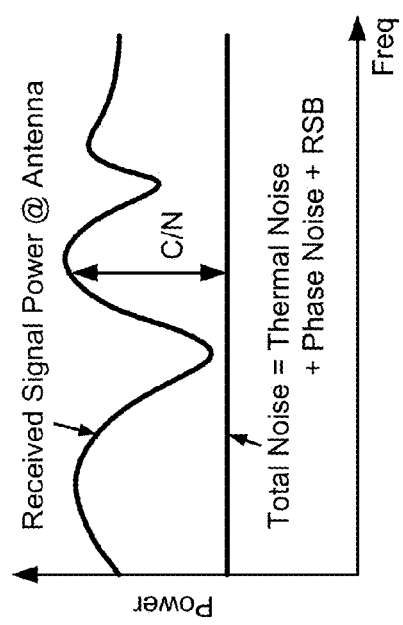

FIG. 4D shows received power versus total noise at the receiver in a faded channel with good/low RSB. The frequency response of a carrier may vary across frequency in a faded channel. The total noise at the receiver may be reduced due to lower RSB resulting from less I/Q imbalance. C/N may improve due to the lower total noise.

RSB may be calibrated by applying a single-tone test signal to a downconverter, downconverting the test signal to baseband, and measuring the amplitude error and phase error between the I and Q downconverted signals. RSB may be improved by adjusting the gain and/or bias of transistors in the I and Q signal paths.

A receiver may also be required to meet specifications for second-order input intercept point (IIP2). IIP2 is a measure of linearity that quantifies second-order distortion generated by nonlinearity of circuits such as amplifiers and mixers. In a receiver, second-order intermodulation (IM2) tones may be generated by jammers of different types such as out-of-band (OOB) jammers and a transmit leakage signal. The transmit leakage signal is a version of a transmit RF signal resulting from coupling between a transmitter and a receiver, e.g., due to insufficient isolation in a duplexer to which the transmitter and receiver are coupled. IM2 tones resulting from a transmit leakage signal may be more troublesome since the transmit leakage signal may be stronger than OOB jammers. IIP2 may be calculated from the strength of IM2 tones. IM2 tone strength (and hence IIP2 performance) may be dependent on a transmit (TX) bandwidth (or the bandwidth of a jammer corresponding to a transmit leakage signal) and TX-to-RX frequency offset (or jammer to in-band offset). This is because a downconverted transmit signal (e.g., a jammer) at an interface between a mixer and a baseband filter may vary depending on the TX bandwidth and the TX-to-RX offset. Hence, it may be desirable to perform IIP2 calibration by taking into account the TX bandwidth and the TX-to-RX offset.

IIP2 may be measured by modulating an LO signal with a modulating signal to generate an amplitude modulated (AM) signal, downconverting the AM signal to baseband, correlating the downconverted signal with the modulating signal, and determining IIP2 based on the correlation results. IIP2 may be improved by adjusting gate bias voltages of transistors having nonlinearity that affects IIP2.

It may be desirable to calibrate a receiver (e.g., during normal operation in the field) in order to ensure good performance even in the presence of variations in IC process, temperature, power supply voltage, etc. It may also be desirable to calibrate a receiver with as little additional hardware as possible in order to reduce cost, circuit area, etc.

In an aspect of the present disclosure, a first receiver may be calibrated with an LO signal from a second receiver. This may enable the first receiver to be efficiently calibrated without requiring additional circuitry to generate a test signal. This may also provide other benefits described below.

Figure 5:
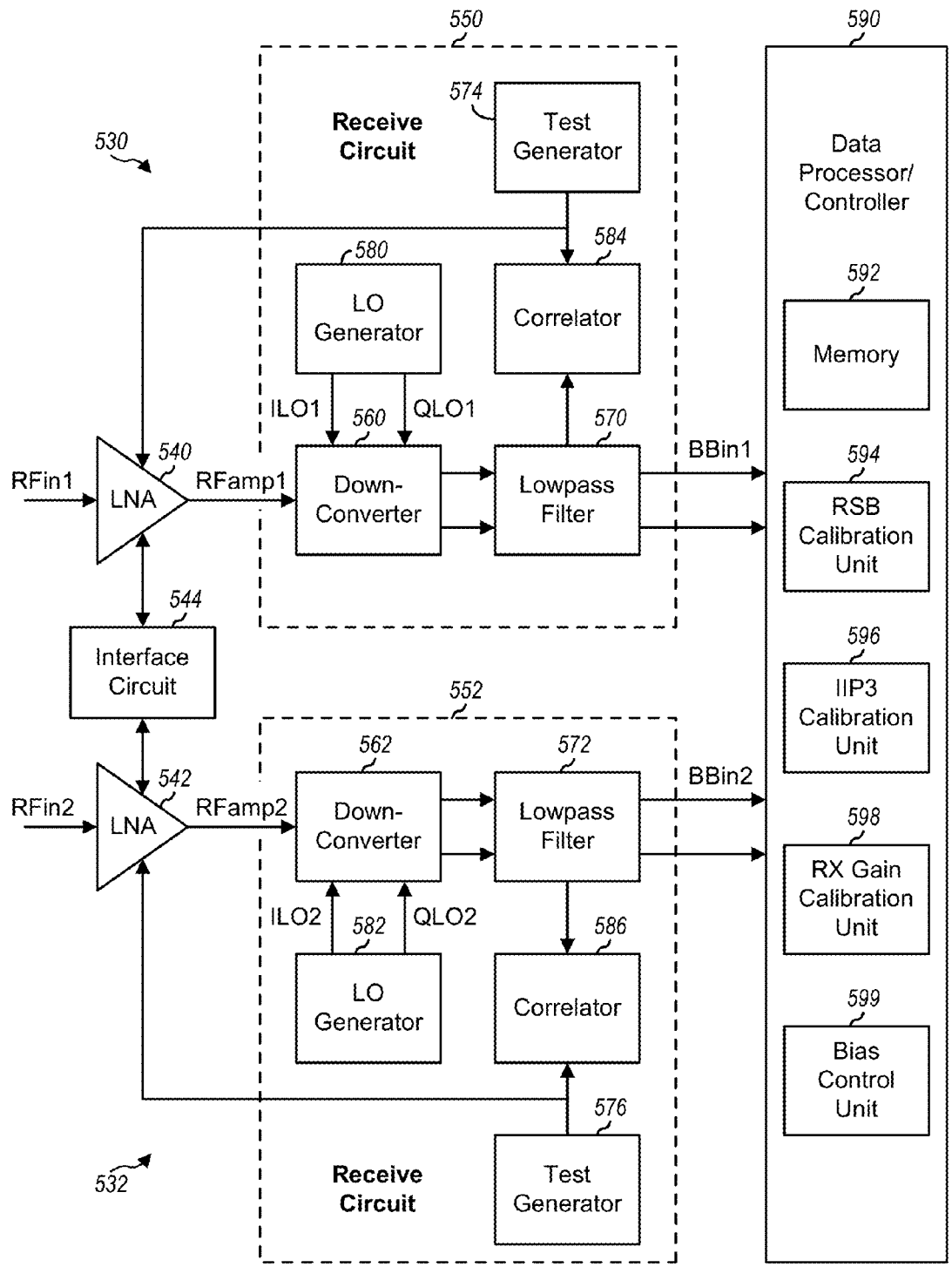
FIG. 5 shows a block diagram of two receivers.

FIG. 5 shows a block diagram of an exemplary design of two receivers 530 and 532 capable of reusing circuitry to generate test signals. Receiver 530 includes an LNA 540 and a receive circuit 550, and receiver 532 includes an LNA 542 and a receive circuit 552. Receivers 530 and 532 may correspond to any two receivers 330 and/or 332 in FIG. 3. LNAs 540 and 542 may correspond to any two LNAs 340 and/or 342 in FIG. 3. Receive circuits 550 and 552 may correspond to any two receive circuits 350 and/or 352 in FIG. 3.

Within receiver 530, LNA 540 has an input receiving a first input RF signal (RFin1), a first output coupled to receive circuit 550, and a second output coupled to an interface circuit 544. LNA 540 may amplify the RFin1 signal and provide a first amplified RF signal (RFamp1) to receive circuit 550. Receive circuit 550 receives the RFamp1 signal from LNA 540 and provides a first input baseband signal (BBin1) to a data processor 590, which may correspond to data processor 390 in FIG. 3. Within receive circuit 550, a downconverter 560 receives the RFamp1 signal from LNA 540 and a first inphase LO signal (ILO1) and a first quadrature LO signal (QLO1) signal from an LO generator 580. An LO generator is a circuit that generates a signal used for frequency conversion. Downconverter 560 downconverts the RFamp1 signal with the ILO1 and QLO1 signals and provides first I and Q downconverted signals. The frequency of the ILO1 and QLO1 signals may be selected based on the center frequency of one or more transmitted signals being received by receive circuit 550. For example, if one transmitted signal is being received, then the frequency of the ILO1 and QLO1 signals may be equal to the center frequency of the transmitted signal. A lowpass filter 570 filters the I and Q downconverted signals to remove undesirable signal components resulting from frequency downconversion, amplifies the filtered I and Q signals, and provides first I and Q input baseband signals to data processor 590.

Within receiver 532, LNA 542 has an input receiving a second input RF signal (RFin2), a first output coupled to receive circuit 552, and a second output coupled to interface circuit 544. LNA 542 amplifies the RFin2 signal and provides a second amplified RF signal (RFamp2) to receive circuit 552. Receive circuit 552 receives the RFamp2 signal from LNA 542 and provides a second input baseband signal (BBin2) to data processor 590. Within receive circuit 552, a downconverter 562 receives the RFamp2 signal from LNA 542 and a second inphase LO signal (ILO2) and a second quadrature LO signal (QLO2) from an LO generator 582, downconverts the RFamp2 signal with the ILO2 and QLO2 signal, and provides I and Q downconverted signals. A lowpass filter 572 filters the I and Q downconverted signals, amplifies the filtered I and Q signals, and provides second I and Q input baseband signals to data processor 590.

Test generators 574 and 576 may generate test control signals used to calibrate receivers 530 and 532, respectively. Correlators 584 and 586 may perform correlation to calibrate receivers 530 and 532, respectively. Test generators 574 and 576 and correlators 584 and 586 are described in detail below.

Data processor 590 may include various units to calibrate receivers 530 and 532. For example, data processor 590 may include a unit 594 that facilitates RSB calibration, a unit 596 that facilitates IIP3 calibration, a unit 598 that facilitates receive path gain calibration, and a unit 599 that control bias of various circuits in receivers 530 and 532. Each unit may facilitate calibration of a particular parameter by controlling generation of test signals and/or control signals, making measurements, performing computations, and/or performing other task for calibration of the particular parameter. Each unit may be implemented in software, hardware, firmware, or a combination thereof.

Receivers 530 and 532 may be implemented in various manners. In one exemplary design, receivers 530 and 532 are implemented on the same IC die, which may result in better integration of the receivers. In another exemplary design, receiver 530 may be implemented on a first IC chip, and receiver 532 may be implemented on a second IC chip, which may improve isolation between the two receivers. Receivers 530 and 532 may also be implemented in other manners.

FIG. 5 shows an exemplary design of receive circuits 550 and 552. In general, the conditioning of the signals in a receive circuit may be performed by one or more amplifiers, filters, mixers, etc. These circuits may be arranged differently from the configuration shown in FIG. 5. Furthermore, other circuits not shown in FIG. 5 may be used in a receive circuit. For example, a filter and/or a gain control circuit may be located between an LNA and a downconverter. As another example, matching circuits may be used to match various circuits in FIG. 5. Some circuits in FIG. 5 may be omitted.

Receivers 530 and 532 may operate in one of multiple operating modes at any given moment. In a receive (RX) mode, one or more receivers may be selected to process one or more input RF signals to recover one or more transmitted signals of interest, e.g., as described above for FIG. 5. In a calibration/test mode, one receiver may be selected for calibration/testing, and another receiver may generate a test signal for the selected receiver.

Figure 6A:
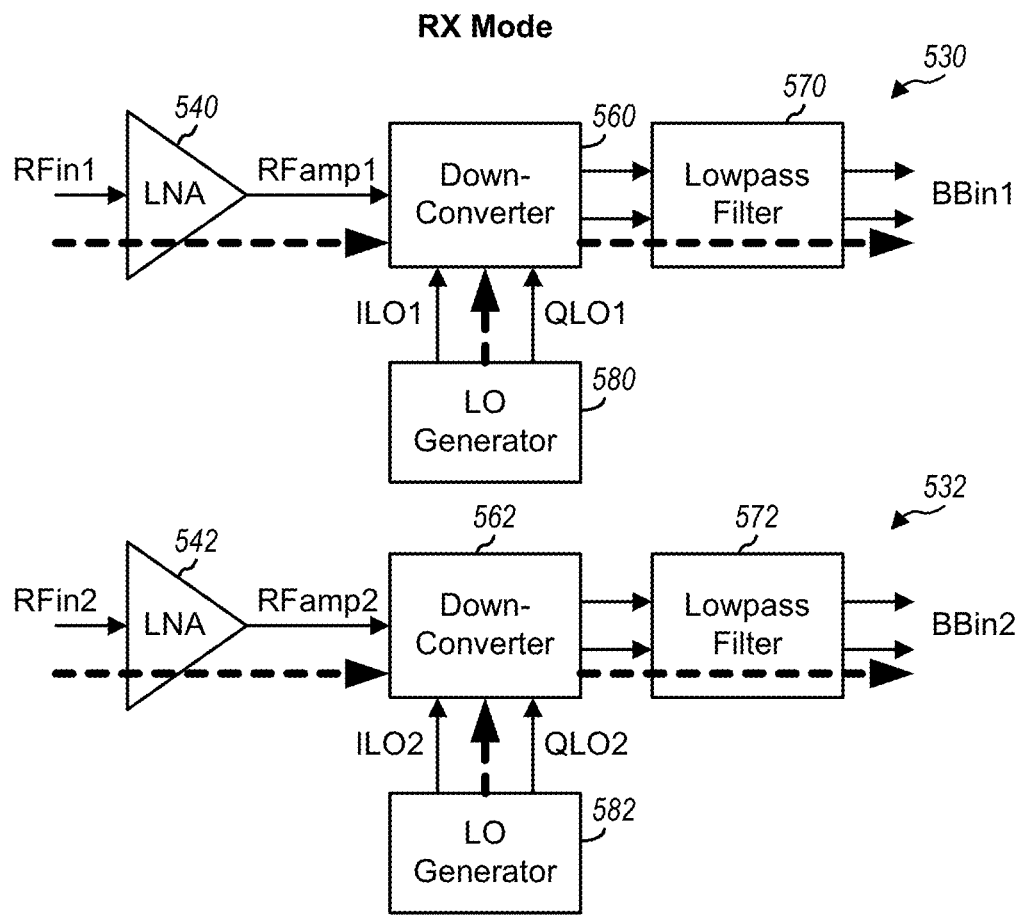
FIGS. 6A to 6C show operation of the two receivers in FIG. 5 in a receive (RX) mode and a calibration mode.

FIG. 6A shows operation of receivers 530 and 532 in FIG. 5 in the RX mode. In general, only receiver 530, or only receiver 532, or both receivers 530 and 532 may be enabled in the RX mode. If receiver 530 is enabled, then LNA 540 may amplify the RFin1 signal and provide the RFamp1 signal to receive circuit 550. Within receive circuit 550, the RFamp1 signal may be downconverted by downconverter 560 with the ILO1 and QLO1 signals from LO generator 580 and filtered by lowpass filter 570 to obtain the BBin1 signal. If receiver 532 is enabled, then LNA 542 may amplify the RFin2 signal and provide the RFamp2 signal to receive circuit 552. Within receive circuit 552, the RFamp2 signal may be downconverted by downconverter 562 with the ILO2 and QLO2 signals from LO generator 582 and filtered by lowpass filter 572 to obtain the BBin2 signal.

Figure 6B:
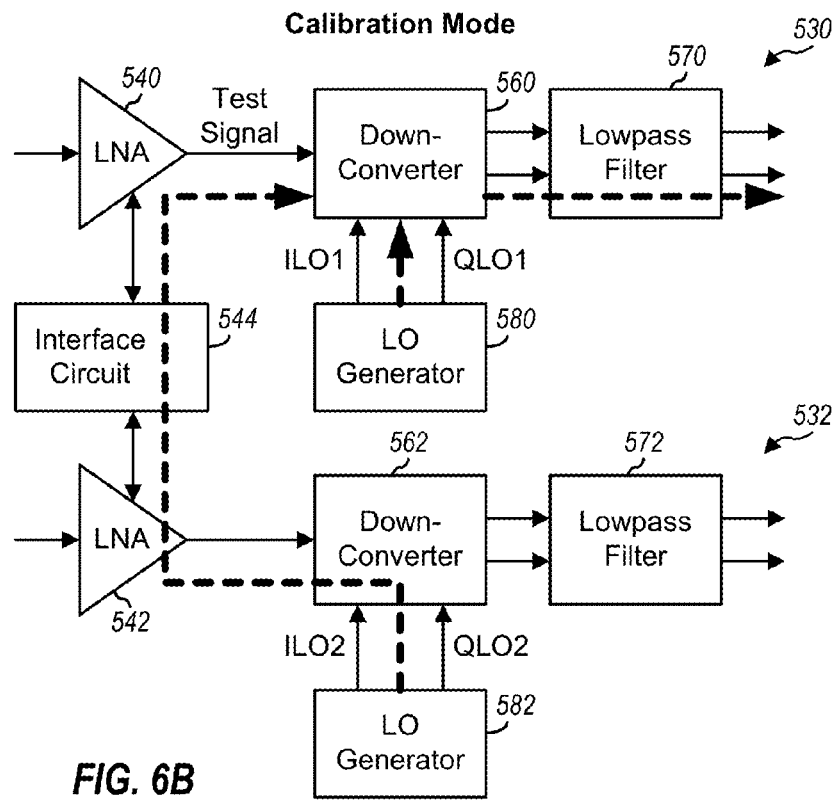

FIG. 6B shows operation of receivers 530 and 532 in FIG. 5 in the calibration mode with receiver 532 providing a test signal to receiver 530. In this case, LO generator 582 within receiver 532 may generate an LO signal, which may be passed through downconverter 562, LNA 542, and interface circuit 544 and provided as a test signal to receiver 530. LO generator 582 can generate the LO signal over a full frequency range and with sufficient frequency accuracy to calibrate receiver 530.

Figure 6C:
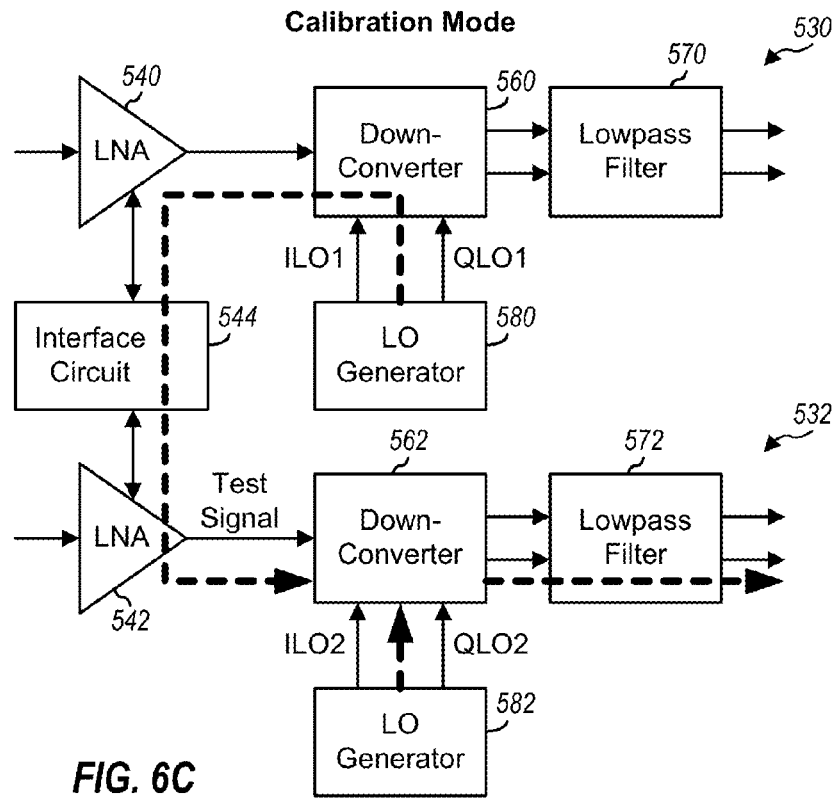

FIG. 6C shows operation of receivers 530 and 532 in FIG. 5 in the calibration mode with receiver 530 providing a test signal to receiver 532. In this case, LO generator 580 within receiver 530 may generate an LO signal, which may be passed through downconverter 560, LNA 540, and interface circuit 544 and provided as a test signal to receiver 532. LO generator 580 can generate the test signal over a full frequency range and with sufficient frequency accuracy to calibrate receiver 532.

Figure 7A:
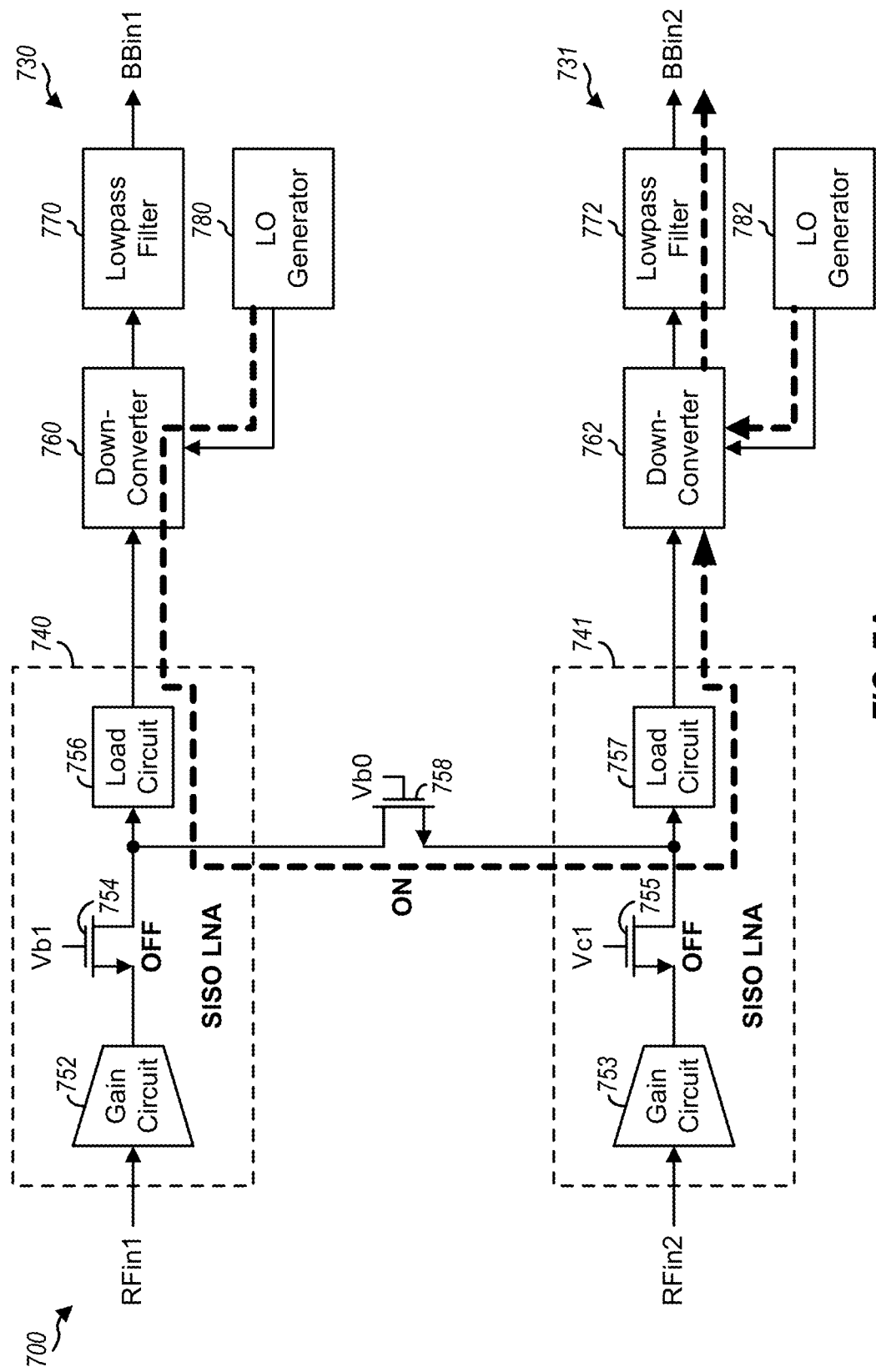
FIGS. 7A to 7C show block diagrams of three exemplary designs of receiver modules with different types of LNAs.

FIG. 7A shows a block diagram of an exemplary design of a receiver module 700. Receiver module 700 includes two receivers 730 and 731. For example, receiver 730 may be for a primary (PRX) antenna and may correspond to any of receivers 330 for antenna 310 in FIG. 3. Receiver 731 may be for a diversity/secondary (DRX) antenna and may correspond to any of receivers 332 for antenna 312 in FIG. 3. Receivers 730 and 731 may also be for two bands, e.g., for a single antenna.

Receiver 730 includes a first single-input single-output (SISO) LNA 740, which may correspond to any of LNAs 340 in FIG. 3. Receiver 731 includes a second SISO LNA 741, which may correspond to any of LNAs 342 in FIG. 3. Receiver 730 further includes a downconverter 760, a lowpass filter 770, and an LO generator 780, which may operate in similar manner as downconverter 560, lowpass filter 570, and LO generator 580 in FIG. 5. Similarly, receiver 731 further includes a downconverter 762, a lowpass filter 772, and an LO generator 782.

LNA 740 has an input receiving a first input RF signal (RFin1) and an output coupled to downconverter 760. LNA 740 may amplify the RFin1 signal and provide a first amplified RF signal to downconverter 760. LNA 741 has an input receiving a second input RF signal (RFin2) and an output coupled to downconverter 762. LNA 741 may amplify the RFin2 signal and provide a second amplified RF signal to downconverter 762.

In the exemplary design shown in FIG. 7A, LNA 740 includes a gain circuit 752, a cascode transistor 754, and a load circuit 756. Gain circuit 752 has an input receiving the RFin1 signal. Cascode transistor 754 has its source coupled to an output of gain circuit 752, its gate receiving a Vb1 control signal, and its drain coupled to an input of load circuit 756. Load circuit 756 has its output coupled to downconverter 760. LNA 741 includes a gain circuit 753, a cascode transistor 755, and a load circuit 757, which are coupled in similar manner as gain circuit 752, cascode transistor 754, and load circuit 756 in LNA 740.

Within LNA 740, gain circuit 752 receives the RFin1 signal and provides and an amplified signal to cascode transistor 754. Cascode transistor 754 may be turned ON or OFF based on the Vb1 voltage at its gate. When cascode transistor 754 is turned ON, the amplified signal from gain circuit 752 is buffered by cascode transistor 754 and provided to load circuit 756, which provides the first amplified RF signal to downconverter 760. LNA 741 operates in similar manner as LNA 740. LNA 741 may amplify the RFin2 signal and provide the second amplified RF signal to downconverter 762.

In the exemplary design shown in FIG. 7A, a pass transistor 758 has its source coupled to the drain of cascode transistor 755, its gate receiving a Vb0 control signal, and its drain coupled to the drain of cascode transistor 754. Transistor 758 operates as a switch and may be turned ON to short the inputs of load circuits 756 and 757 in order to route an LO signal from one receiver to another receiver.

Receivers 730 and 731 may be implemented in various manners. In one exemplary design, receivers 730 and 731 may be implemented on the same IC die. In another exemplary design, receiver 730 may be implemented on one IC die, and receiver 731 may be implemented on another IC die. Receivers 730 and 731 may also be implemented in other manners.

Receivers 730 and 731 may support multiple operating modes, which may include an RX mode and a calibration/test mode. In the RX mode, LNA 740 and receiver 730 may be enabled to process the RFin 1 signal to recover one or more transmitted signals. Alternatively or additionally, LNA 741 and receiver 731 may be enabled to process the RFin2 signal to recover one or more transmitted signals.

In the calibration/test mode, one receiver may be selected for calibration/testing, and an LO generator for another receiver may generate a test signal for the selected receiver. In a first configuration of the test mode, receiver 731 may be calibrated by using LO generator 780 to generate a test signal for receiver 731, as shown in FIG. 7A. In the first configuration, the LO signal from LO generator 780 may be passed through downconverter 760, load circuit 756, transistor 758, and load circuit 757 and provided as a test signal to downconverter 762 within receiver 731. In a second configuration of the test mode, receiver 730 may be calibrated by using LO generator 782 to generate a test signal for receiver 730. In the second configuration, the LO signal from LO generator 782 may be passed through downconverter 762, load circuit 757, transistor 758, and load circuit 756 and provided as a test signal to downconverter 760 within receiver 730 (not shown in FIG. 7A).

Figure 7B:
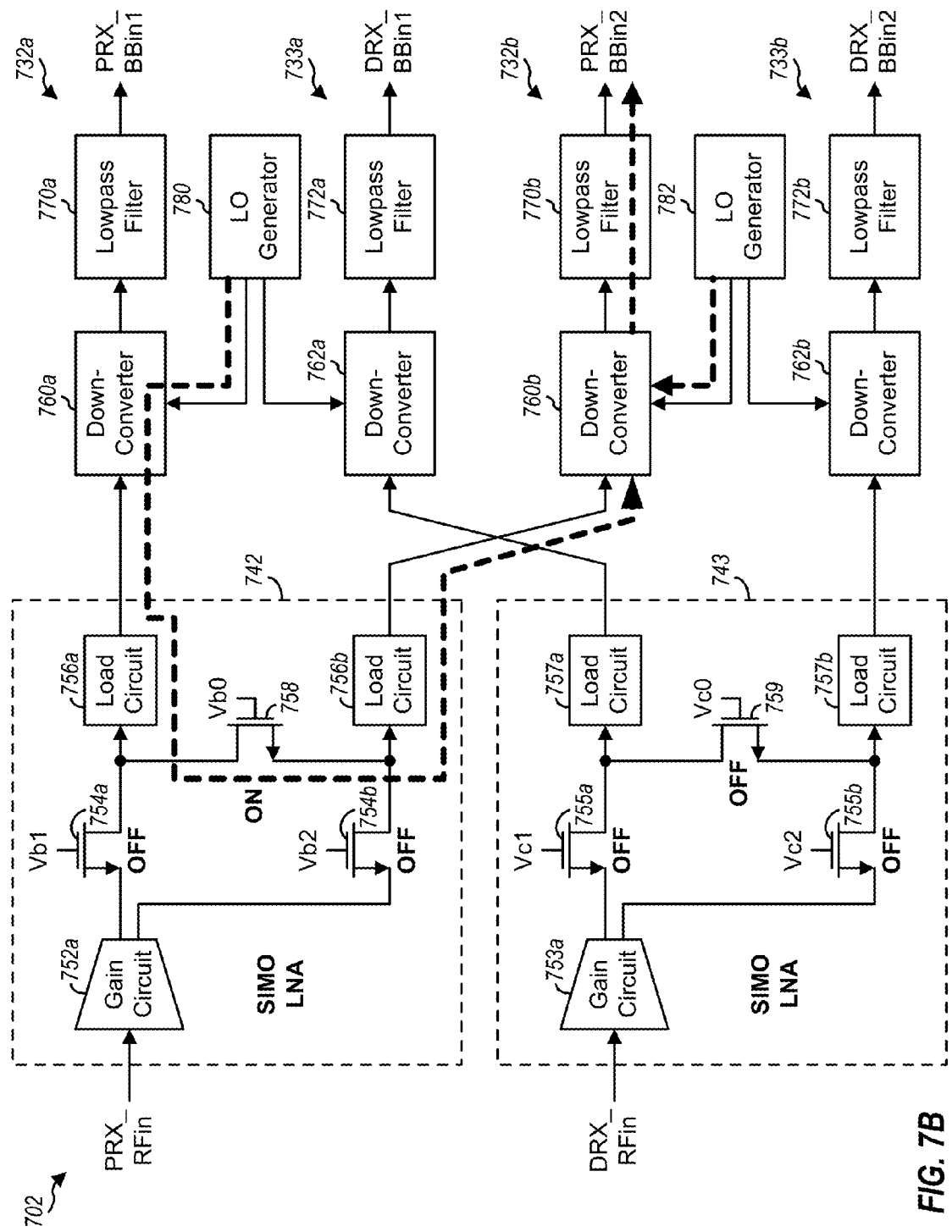

FIG. 7B shows a block diagram of an exemplary design of a receiver module 702 supporting intra-band CA on two sets of carriers for two antennas. Each set of carriers may include one or more carriers. Receiver module 702 includes four receivers 732a, 732b, 733a and 733b. Receivers 732a and 732b are for first and second sets of carriers, respectively, for a primary antenna and may correspond to two receivers 330 for antenna 310 in FIG. 3. Receivers 733a and 733b are for the first and second sets of carriers, respectively, for a diversity antenna and may correspond to two receivers 332 for antenna 312 in FIG. 3. Receivers 732a and 732b share a first single-input multiple-output (SIMO) LNA 742 for the primary antenna, which may correspond to two LNAs 340 in FIG. 3. Receivers 733a and 733b share a second SIMO LNA 743 for the diversity antenna, which may correspond to two LNAs 342 in FIG. 3. Each receiver 732 further includes a downconverter 760 and a lowpass filter 770, which may operate in similar manner as downconverter 560 and lowpass filter 570 in FIG. 5. Similarly, each receiver 733 further includes a downconverter 762 and a lowpass filter 772. Receivers 732a and 733a for the first set of carriers share an LO generator 780. Receivers 732b and 733b for the second set of carriers share an LO generator 782.

LNA 742 has an input receiving an input RF signal (PRX_RFin) from the primary antenna, a first output coupled to downconverter 760a within receiver 732a, and a second output coupled to downconverter 760b within receiver 732b. LNA 742 may amplify the PRX_RFin signal and provide a first amplified RF signal to downconverter 760a and/or a second amplified RF signal to downconverter 760b. LNA 743 has an input receiving an input RF signal (DRX_RFin) from the diversity antenna, a first output coupled to downconverter 762a within receiver 733a, and a second output coupled to downconverter 762b within receiver 733b. LNA 743 may amplify the DRX_RFin signal and provide a third amplified RF signal to downconverter 762a and/or a fourth amplified RF signal to downconverter 762b.

In the exemplary design shown in FIG. 7B, LNA 742 includes a gain circuit 752a, two cascode transistors 754a and 754b, a pass transistor 758, and two load circuits 756a and 756b. Gain circuit 752a has an input receiving the PRX_RFin signal. Cascode transistor 754a has its source coupled to a first output of gain circuit 752a, its gate receiving a Vb1 control signal, and its drain coupled to an input of load circuit 756a. Cascode transistor 754b has its source coupled to a second output of gain circuit 752a, its gate receiving a Vb2 control signal, and its drain coupled to an input of load circuit 756b. Load circuits 756a and 756b have their outputs coupled to downconverters 760a and 760b, respectively. Pass transistor 758 has its source coupled to the drain of cascode transistor 754b, its gate receiving a Vb0 control signal, and its drain coupled to the drain of cascode transistor 754a.

Within LNA 742, gain circuit 752a receives the PRX_RFin signal and provides and an amplified signal to cascode transistor 754a and/or 754b. Each cascode transistor 754 may be turned ON or OFF based on the control voltage at its gate. When cascode transistor 754a is turned ON, the amplified signal from gain circuit 752a is buffered by cascode transistor 754a, routed through load circuit 756a, and provided as the first amplified RF signal to downconverter 760a (not shown in FIG. 7B). Similarly, when cascode transistor 754b is turned ON, the amplified signal from gain circuit 752a is buffered by cascode transistor 754b, routed through load circuit 756b, and provided as the second amplified RF signal to downconverter 760b (also not shown in FIG. 7B).

LNA 743 includes a gain circuit 753a, cascode transistors 755a and 755b, load circuits 757a and 757b, and a pass transistor 759, which are coupled in similar manner as gain circuit 752a, cascode transistors 754a and 754b, load circuits 756a and 756b, and pass transistor 758 in LNA 742. LNA 743 may amplify the DRX_RFin signal and provide the third amplified RF signal to downconverter 762a and/or the fourth amplified RF signal to downconverter 762b.

In the exemplary design shown in FIG. 7B, LNA 742 includes pass transistor 758 coupled between the inputs of load circuits 756a and 756b. Pass transistor 758 operates as a switch and may be turned ON to short the inputs of load circuits 756a and 756b in order to route an LO signal from one receiver to another receiver. Similarly, LNA 743 includes pass transistor 759 operating as a switch and may be turned ON to short the inputs of load circuits 757a and 757b in order to route an LO signal from one receiver to another receiver.

Receivers 732a to 733b may be implemented in various manners. In one exemplary design, receivers 732a to 733b may be implemented on the same IC die. In another exemplary design, receivers 732a and 733a may be implemented on one IC die, and receivers 732b and 733b may be implemented on another IC die. Receivers 732a to 733b may also be implemented in other manners.

Receivers 732a to 733b may support multiple operating modes, which may include a primary RX mode, a full RX mode, and a calibration/test mode. In the primary RX mode, LNA 742 and receiver 732a and/or 732b may be enabled to process the PRX_RFin signal to recover one or more transmitted signals on one set of carriers. Alternatively, LNA 743 and receiver 733a and/or 733b may be enabled to process the DRX_RFin signal to recover one or more transmitted signals on one set of carriers. In the full RX mode, LNAs 742 and 743 and receivers 732a to 733b may be enabled to process the PRX_RFin and DRX_RFin signals from two antennas to recover one or more transmitted signals on one or two sets of carriers.

In the calibration/test mode, one receiver may be selected for calibration/testing, and an LO generator for another receiver may generate a test signal for the selected receiver. In a first configuration of the test mode, receiver 732b may be calibrated by using LO generator 780 to generate a test signal for receiver 732b, as shown in FIG. 7B. In the first configuration, the LO signal from LO generator 780 may be passed through downconverter 760a, load circuit 756a, transistor 758, and load circuit 756b and provided as a test signal to downconverter 760b within receiver 732b. In a second configuration of the test mode, receiver 732a may be calibrated by using LO generator 782 to generate a test signal for receiver 732a. In the second configuration, the LO signal from LO generator 782 may be passed through downconverter 760b, load circuit 756b, transistor 758, and load circuit 756a and provided as a test signal to downconverter 760a within receiver 732a (not shown in FIG. 7B).

Figure 7C:
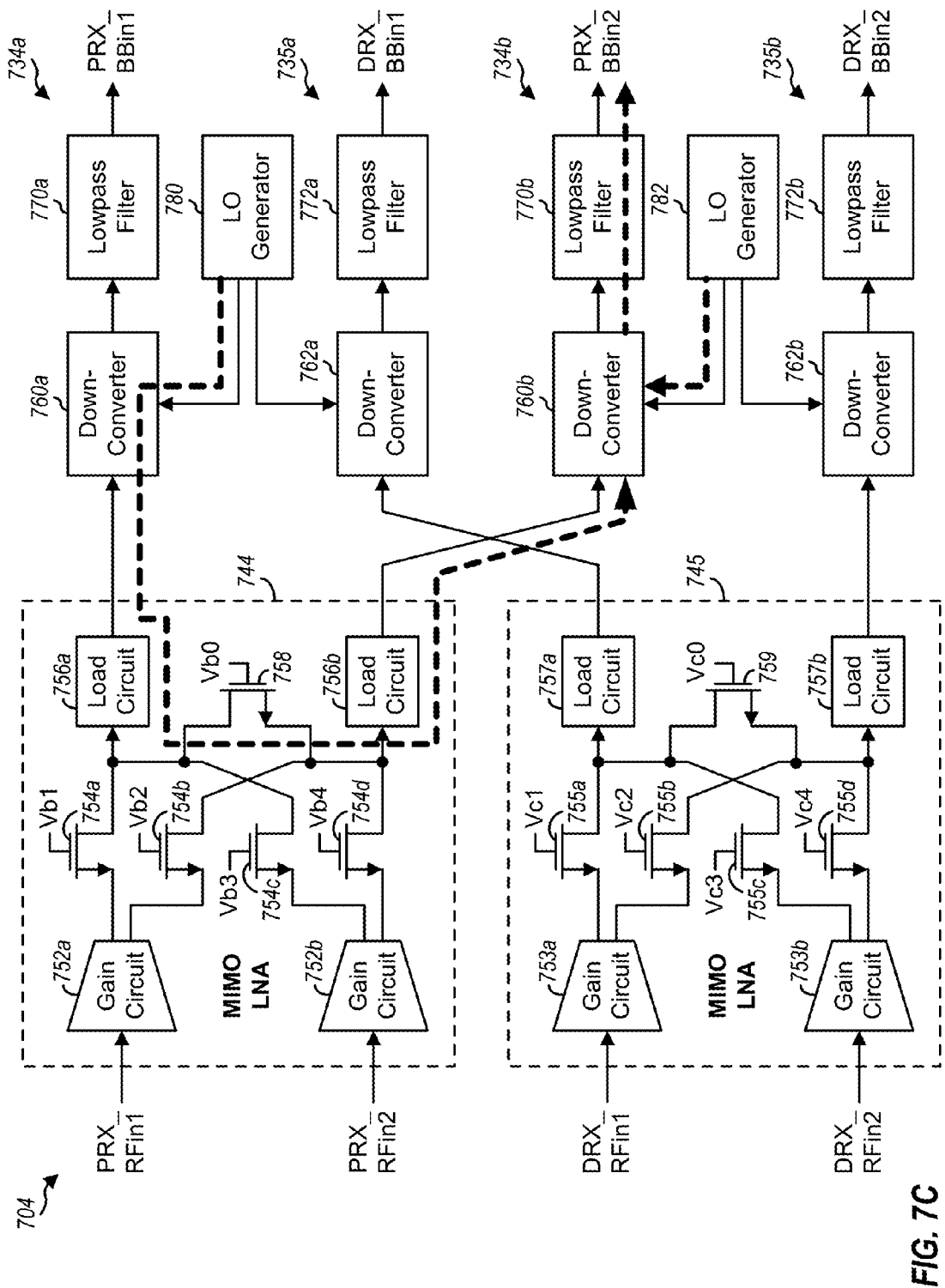

FIG. 7C shows a block diagram of an exemplary design of a receiver module 704 supporting intra-band CA and inter-band CA on two sets of carriers for two antennas. Receiver module 704 includes four receivers 734a, 734b, 735a and 735b. Receivers 734a and 734b share a first multiple-input multiple-output (MIMO) LNA 744 for the primary antenna, which may correspond to two LNAs 340 in FIG. 3. Receivers 735a and 735b share a second MIMO LNA 745 for the diversity antenna, which may correspond to two LNAs 342 in FIG. 3. Each receiver further includes a downconverter and a lowpass filter, which may operate in similar manner as downconverter 560 and lowpass filter 570 in FIG. 5. Receivers 734a and 735a for the first set of carriers share LO generator 780. Receivers 734b and 735b for the second set of carriers share LO generator 782.

LNA 744 has a first input receiving a first input RF signal (PRX_RFin1) from the primary antenna, a second input receiving a second input RF signal (PRX_RFin2) from the primary antenna, a first output coupled to downconverter 760a within receiver 734a, and a second output coupled to downconverter 760b within receiver 734b. LNA 744 may amplify one or two input RF signals and provide one or two amplified RF signals to one or two downconverters. Similarly, LNA 745 has a first input receiving a first input RF signal (DRX_RFin1) from the diversity antenna, a second input receiving a second input RF signal (DRX_RFin2) from the diversity antenna, a first output coupled to downconverter 762a within receiver 735a, and a second output coupled to downconverter 762b within receiver 735b. LNA 745 may amplify one or two input RF signals and provide one or two amplified RF signals to one or two downconverters.

In the exemplary design shown in FIG. 7C, LNA 744 includes two gain circuits 752a and 752b, four cascode transistors 754a to 754d, two load circuits 756a and 756b, and pass transistor 758. Gain circuit 752a, cascode transistors 754a and 754b, pass transistor 758, and load circuits 756a and 756b are coupled as described above for LNA 742 in FIG. 7B. Gain circuit 752b has an input receiving the PRX_RFin2 signal. Cascode transistor 754c has its source coupled to a first output of gain circuit 752b, its gate receiving a Vb3 control signal, and its drain coupled to the input of load circuit 756a. Cascode transistor 754d has its source coupled to a second output of gain circuit 752b, its gate receiving a Vb4 control signal, and its drain coupled to the input of load circuit 756b. LNA 745 includes two gain circuits 753a and 753b, four cascode transistors 755a to 755d, two load circuits 757a and 757b, and a pass transistor 759, which are coupled in similar manner as gain circuits 752a and 752b, cascode transistors 754a to 754d, load circuits 756a and 756b, and pass transistor 758 in LNA 744.

Receivers 734a to 735b may operate in one of multiple operating modes, which may include a single-output mode (e.g., a non-CA mode), intra-band CA mode, an inter-band CA mode, and a calibration/test mode. In the single-output mode, LNA 744 may amplify one RFin signal and provide one amplified RF signal to downconverter 760a or 760b. For example, gain circuit 752a and either cascode transistor 754a or 754b may be enabled to provide one amplified RF signal to downconverter 760a or 760b. Alternatively LNA 745 may amplify one RFin signal and provide one amplified RF signal to downconverter 762a or 762b.

In the intra-band CA mode, LNA 744 may amplify one RFin signal and provide two amplified RF signals to two downconverters 760a and 760b. For example, gain circuit 752a and both cascode transistors 754a and 754b may be enabled to provide two amplified RF signals to downconverters 760a and 760b. Alternatively LNA 745 may amplify one RFin signal and provide two amplified RF signals to two downconverters 762a and 762b.

In the inter-band CA mode, LNA 744 may amplify two RFin signals and provide two amplified RF signals to two downconverters 760a and 760b. For example, gain circuits 752a and 752 and cascode transistor 754a or 754d may be enabled to provide two amplified RF signals to downconverters 760a and 760b. Alternatively, LNA 745 may amplify two RFin signals and provide two amplified RF signals to two downconverters 762a and 762b.

In the calibration/test mode, one receiver may be selected for calibration/testing, and an LO generator for another receiver may generate a test signal for the selected receiver. In a first configuration of the test mode, receiver 734b may be calibrated by using LO generator 780 to generate a test signal for receiver 734b, as shown in FIG. 7C. In the first configuration, the LO signal from LO generator 780 may be routed through downconverter 760a, passed through load circuit 756a, transistor 758, and load circuit 756b and provided as a test signal to downconverter 760b. In a second configuration of the test mode, receiver 734a may be calibrated by using LO generator 782 to generate a test signal for receiver 734a. In the second configuration, the LO signal from LO generator 782 may be routed through downconverter 760b, passed through load circuit 756b, transistor 758, and load circuit 756a and provided as a test signal to downconverter 760a (not shown in FIG. 7C).

Figure 8:
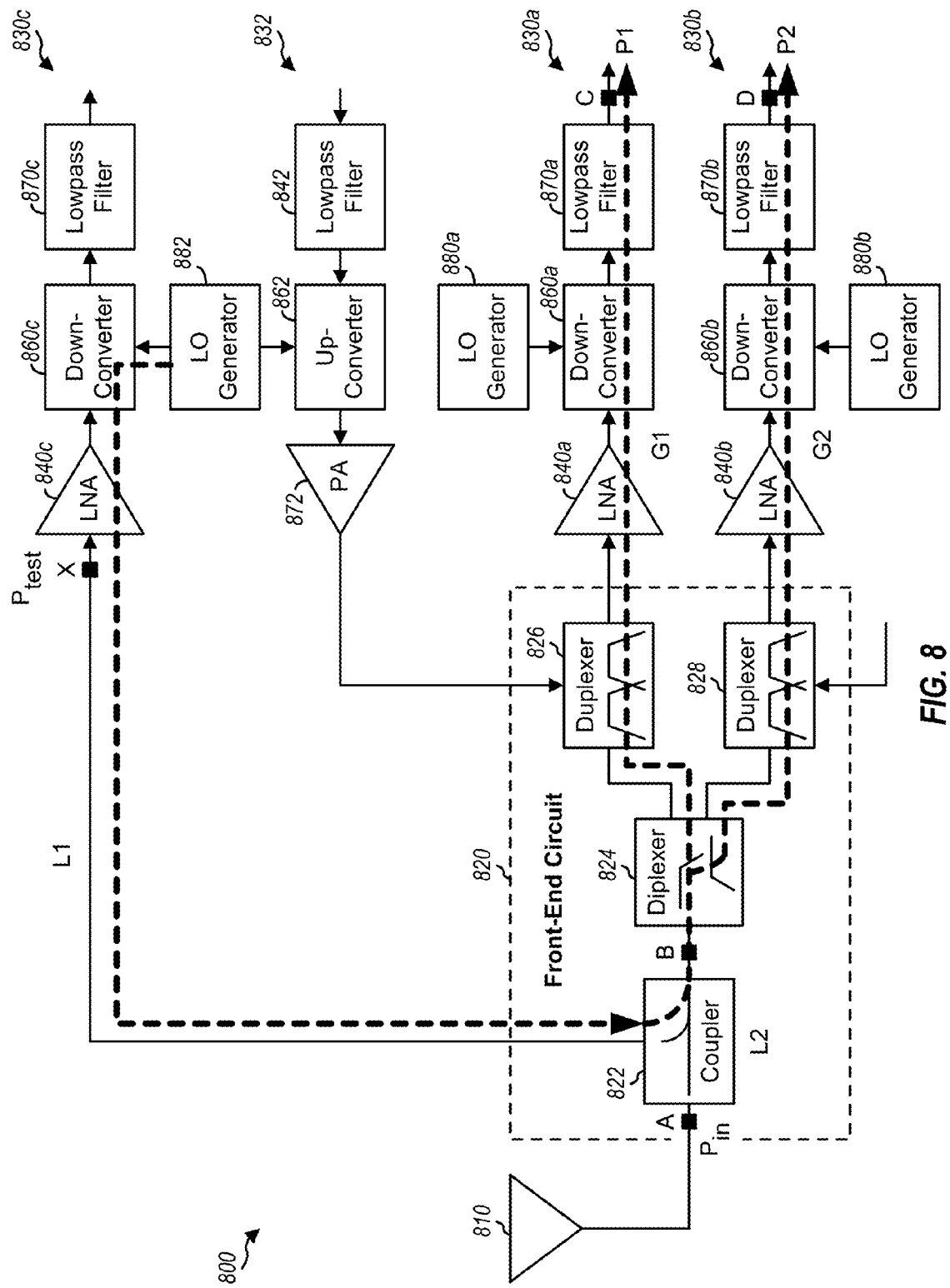
FIG. 8 shows a block diagram of a transceiver.

FIG. 8 shows a block diagram of an exemplary design of a transceiver 800 that supports generation of a test signal for one receiver with an LO generator for another receiver. Transceiver 800 includes two receivers 830a and 830b for two bands, a feedback receiver 830c, and a transmitter 832. Each receiver 830 includes an LNA 840, a downconverter 860, and a lowpass filter 870. Receiver 830a further includes an LO generator 880a to generate a first LO signal for downconverter 860a. Receiver 830b further includes an LO generator 880b to generate a second LO signal for downconverter 860b. Transmitter 832 includes a lowpass filter 842, an upconverter 862, and a PA 872. Transmitter 832 and feedback receiver 830c share an LO generator 882, which generates an LO signal for downconverter 860c and upconverter 862. In an exemplary design, receivers 830a and 830b may be used to receive transmitted signals, and receiver 830c may be used to test transmitter 832. In general, each receiver may be used to receive transmitted signals and/or to test a transmitter and/or a receiver.

In the exemplary design shown in FIG. 8, a front-end circuit 820 is coupled between an antenna 810 and receivers 830a, 830b and 830c and transmitter 832. Within front-end circuit 820, a directional coupler 822 has an input port coupled to node B, an output port coupled to node A (or antenna 812), and a third port coupled to LNA 840c. Coupler 822 may be located physically close to antenna 810 in order to provide more accurate transmit power measurement by including all front-end circuits. A diplexer 824 has a first input coupled to the output of a duplexer 826, a second input coupled to the output of a duplexer 828, and an output coupled to coupler 822. Diplexer 824 may include (i) a lowpass filter to pass at least one band of interest at lower frequency and (ii) a highpass filter to pass at least one other band of interest at higher frequency. Each duplexer may include a transmit filter and a receive filter for a band of interest. Duplexer 826 has its transmit filter input coupled to the output of PA 872 and its receive filter output coupled to the input of LNA 840a. Duplexer 828 has its transmit filter input coupled to a PA or some other circuit (not shown in FIG. 8) and its receive filter output coupled to the input of LNA 840b.

Feedback receiver 830c may be used to test transmitter 832. For example, feedback receiver 830c may be used to measure the transmit power at the antenna port, e.g., in the factory during manufacturing or in the field during operation of the wireless device. In this case, a portion of a transmit RF signal generated by transmitter 832 may be coupled via coupler 822 to receiver 830c. Receiver 830c may downconvert the coupled RF signal based on the same LO signal used for transmitter 832. The downconverted signal may be processed to determine the performance of transmitter 832.

In an exemplary design, LO generator 882 may be used to generate a test signal for receiver 830a and/or 830b. To test receiver 830a, the LO signal from LO generator 882 may be passed through downconverter 860c, LNA 840c, coupler 822, diplexer 824 and duplexer 826 and provided as a test signal to LNA 840a within receiver 830a. To test receiver 830b, the LO signal from LO generator 882 may be passed through downconverter 860c, LNA 840c, directional coupler 822, diplexer 824 and duplexer 828 and provided as a test signal to LNA 840b within receiver 830b.

Receiver 830c may enable calibration of receivers 830a and 830b by taking into account circuits within front-end circuit 820. An absolute gain measurement may be made for a first receive signal path. Gain measurements may be made for the first receive signal path and a second receive signal path and may be compared to obtain a relative gain (or a gain delta) of the second receive signal path relative to the first receive signal path. An absolute gain of the second receive signal path may be obtained based on an absolute gain of the first receive signal path and the gain delta between the first and second receive signal paths.

FIG. 8 shows an exemplary design of transceiver 800 including three receivers 830a, 830b and 830c and one transmitter 832. In general, a transceiver may include any number of receivers and any number of transmitters. FIG. 8 also shows an exemplary design of front-end circuit 820 coupled to three receivers 830a, 830b and 830c and one transmitter 832. In general, a front-end circuit may couple any number of receivers and any number of transmitters to an antenna. A front-end circuit may include one or more couplers, diplexers, duplexers, switches, filters, matching circuits, etc. FIG. 8 shows an exemplary design of front-end circuit 820 including two duplexers 826 and 828 for two bands coupled to one diplexer 824. Diplexers, duplexers, couplers, switches, filters, matching circuits, and/or other circuits in a front-end circuit may also be coupled in other manners.

FIGS. 5, 7A, 7B, 7C and 8 show some exemplary designs of using an LO generator for one receiver to generate a test signal for another receiver. In general, multiple receivers may be used to support multiple antennas, multiple bands, multiple radio technologies, receive diversity, MIMO transmission, etc. An LO generator for a first receiver may be used to generate an LO signal, which may be passed to a second receiver and provided as a test signal to the second receiver. Appropriate circuits (e.g., switches, couplers, etc.) may be placed in the signal path between the two receivers to enable the LO signal to be passed from the first receiver to the second receiver.

Circuits in receivers may be implemented with various circuit designs. Some exemplary designs of LNAs, downconverters, and lowpass filters within two receivers are described below. The circuits in receivers may also be implemented with transistors of various types. Some exemplary designs of LNAs and downconverters implemented with N-channel metal oxide semiconductor (NMOS) transistors are described below.

Figure 9:
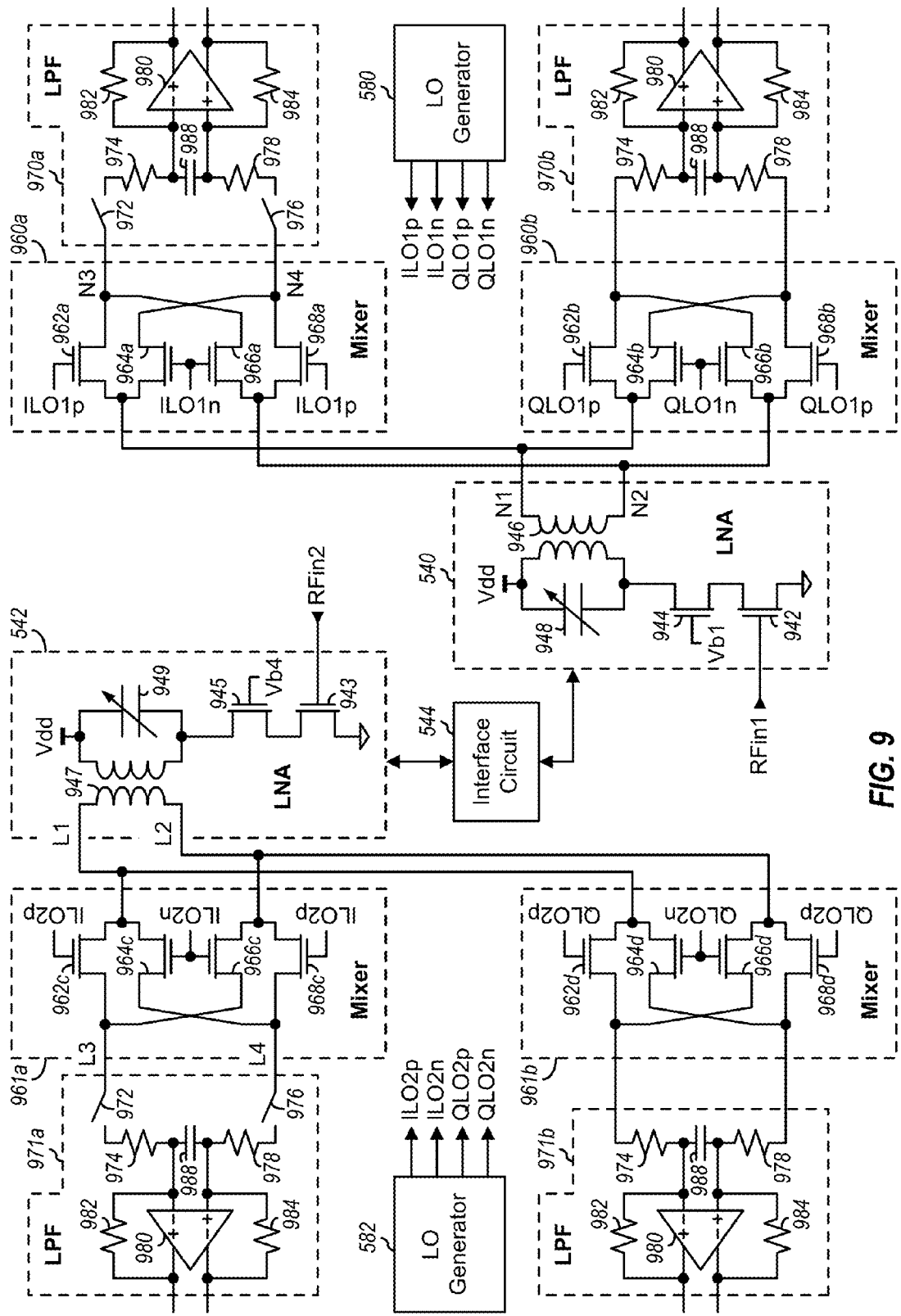
FIG. 9 shows a schematic diagram of exemplary designs of LNAs, downconverters, and lowpass filters.

FIG. 9 shows a schematic diagram of exemplary designs of LNAs 540 and 542, downconverters 560 and 562, and lowpass filters 570 and 572 in FIG. 5. In the exemplary design shown in FIG. 9, within receiver 530, downconverter 560 includes two mixers 960a and 960b for the I and Q signal paths, respectively, and lowpass filter 570 includes two lowpass filters (LPFs) 970a and 970b for the I and Q signal paths, respectively. Within receiver 532, downconverter 562 includes two mixers 961a and 961b for the I and Q signal paths, respectively, and lowpass filter 570 includes two filters 971a and 971b for the I and Q signal paths, respectively.

In the exemplary design shown in FIG. 9, LNA 540 is implemented as a common-source LNA. Within LNA 540, a gain transistor 942 has its source coupled to circuit ground and its gate receiving an RFin1 signal. Alternatively, gain transistor 942 may have its source coupled to one end of a source degeneration inductor, which may have the other end coupled to circuit ground (not shown in FIG. 9). A cascode transistor 944 has its source coupled to the drain of gain transistor 942 and its gate receiving a Vb1 bias voltage. A transformer 946 has (i) a primary coil coupled between the drain of cascode transistor 944 and the VDD supply and (ii) a secondary coil coupled between nodes N1 and N2 and providing a differential amplified RF signal to mixers 960a and 960b. A transformer may also be referred to as a balun. A variable capacitor 948 is coupled between the drain of cascode transistor 944 and the VDD supply. Gain transistor 942 and cascode transistor 944 may be implemented with NMOS transistors (as shown in FIG. 9) or with transistors of other types.

In the exemplary design shown in FIG. 9, LNA 542 includes a gain transistor 943, a cascode transistor 945, a transformer 947, and a variable capacitor 949, which may be coupled in similar manner as gain transistor 942, cascode transistor 944, transformer 946, and capacitor 948, respectively, in LNA 540. LNA 540 and/or 542 may also be implemented as a common-gate LNA. For example, LNA 540 may have the RFin1 signal applied to the source of transistor 942 and a bias voltage applied to the gate of transistor 942.

In the exemplary design shown in FIG. 9, mixers 960a, 960b, 961a and 961b are implemented with double-balanced passive mixers. Mixer 960a includes two pairs of NMOS transistors that are cross-coupled together. Transistors 962a and 964a have their sources coupled together and to node N1 and their drains coupled to nodes N3 and N4, respectively. Similarly, transistors 966a and 968a have their sources coupled together and to node N2 and their drains coupled to nodes N3 and N4, respectively. The ILO1 signal from LO generator 580 may be a differential signal comprising a non-inverting LO1 signal (ILO1p) and an inverting ILO1 signal (ILO1n). The ILO1p signal is provided to the gates of transistors 962a and 968a, and the ILO1n signal is provided to the gates of transistors 964a and 966a. Nodes N1 and N2 correspond to a differential input of mixer 960a, and nodes N3 and N4 correspond to a differential output of mixer 960a. Mixers 960b, 961a and 961b are implemented in similar manner as mixer 960a. Each mixer 960 receives a differential amplified RF signal from an associated LNA and a differential ILO or QLO signal from an associated LO generator and provides a differential I or Q downconverted signal.

In the exemplary design shown in FIG. 9, lowpass filters 570a, 570b, 571a and 571b are implemented with active filters that perform filtering and amplification. Within filter 570a, a switch 972 and a resistor 974 are coupled in series, and the combination is coupled between node N3 and an inverting input of an amplifier 980. A switch 976 and a resistor 978 are coupled in series, and the combination is coupled between node N4 and a non-inverting input of amplifier 980. A capacitor 988 is coupled between the inverting and non-inverting inputs of amplifier 980. A resistor 982 is coupled between the inverting input and a non-inverting output of amplifier 980. A resistor 984 is coupled between the non-inverting input and an inverting output of amplifier 980. Amplifier 980 provides a differential I downconverted signal via its non-inverting and inverting outputs. Lowpass filters 970b, 971a and 971b are implemented in similar manner as lowpass filter 970a.

FIG. 9 shows exemplary designs of LNAs 540 and 542, downconverters 560 and 562, and lowpass filters 570 and 572. LNAs, downconverters, and lowpass filters may also be implemented with other circuit designs. For example, an LNA may be implemented with an inverter-type LNA comprising an NMOS transistor and a PMOS transistor coupled in a stack and between the VDD supply and circuit ground. Mixers 960a, 960b, 961a and 961b may be implemented with passive mixers as shown in FIG. 9 or with mixers of other types.

In one exemplary design, the same circuit design may be used for multiple receivers. For example, the same LNA and mixer designs may be applied to multiple receivers, e.g., receivers for all bands in a multi-band, multi-mode wireless device. In another exemplary design, different circuit designs may be used for different receivers. For example, different receivers may be associated with different LNA designs, different mixer designs, different biasing, etc.

Figure 10A:
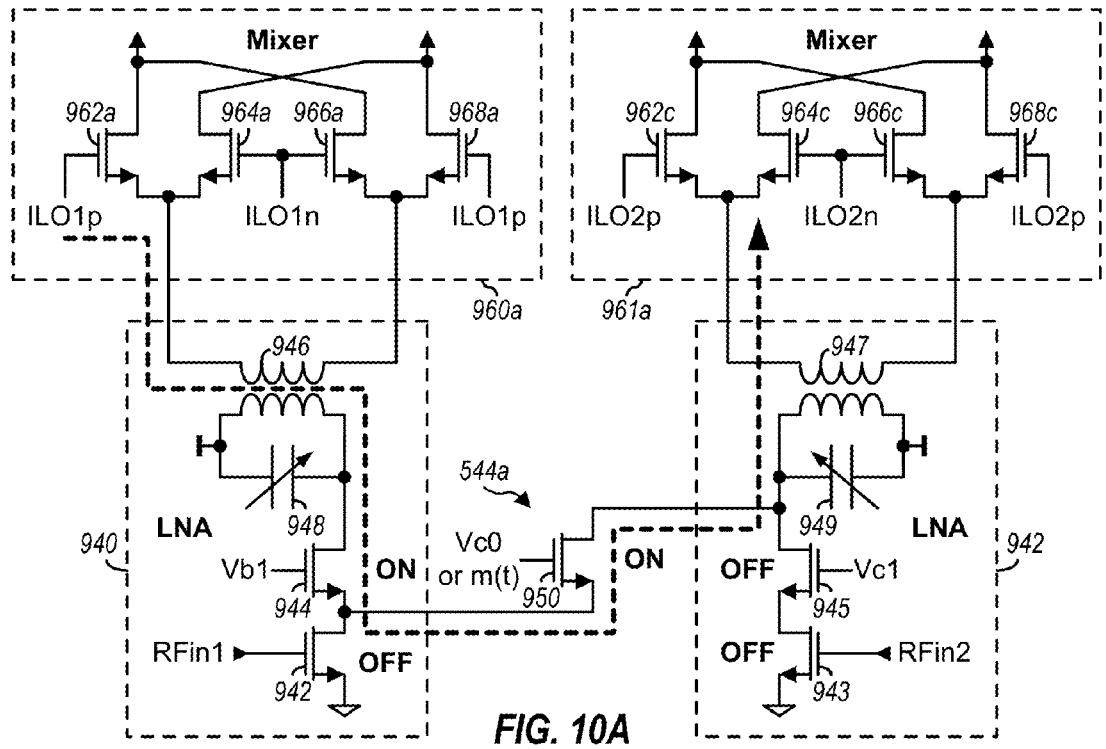
FIGS. 10A to 10C show three exemplary designs of an interface circuit.

FIG. 10A shows an exemplary design of an interface circuit 544a to couple an LO signal from an LO generator for one receiver to another receiver being calibrated. In the exemplary design shown in FIG. 10A, interface circuit 544a includes a cascode transistor 950 having its source coupled to the drain of gain transistor 942 within LNA 940, its gate receiving a Vc0 control signal or a modulation signal m(t), and its drain coupled to the drain of cascode transistor 945 within LNA 942.

To generate a test signal for mixer 961a, cascode transistors 944 and 950 may be turned ON, and gain transistor 942 and 943 and cascode transistor 945 may be turned OFF, as shown in FIG. 10A. The LO signal may be provided to the gate of transistor 962a within mixer 960a, passed through transformer 946 and cascode transistors 944 and 950, and provided as a test signal by transformer 947 to mixer 961a. To generate a test signal for mixer 960a, cascode transistors 944 and 950 may be turned ON, and gain transistor 942 and 943 and cascode transistor 945 may be turned OFF, as shown in FIG. 10A. An LO signal may be provided to the gate of transistor 962c within mixer 961a, passed through transformer 947 and cascode transistors 944 and 950, and provided as a test signal by transformer 946 to mixer 960a.

Figure 10B:
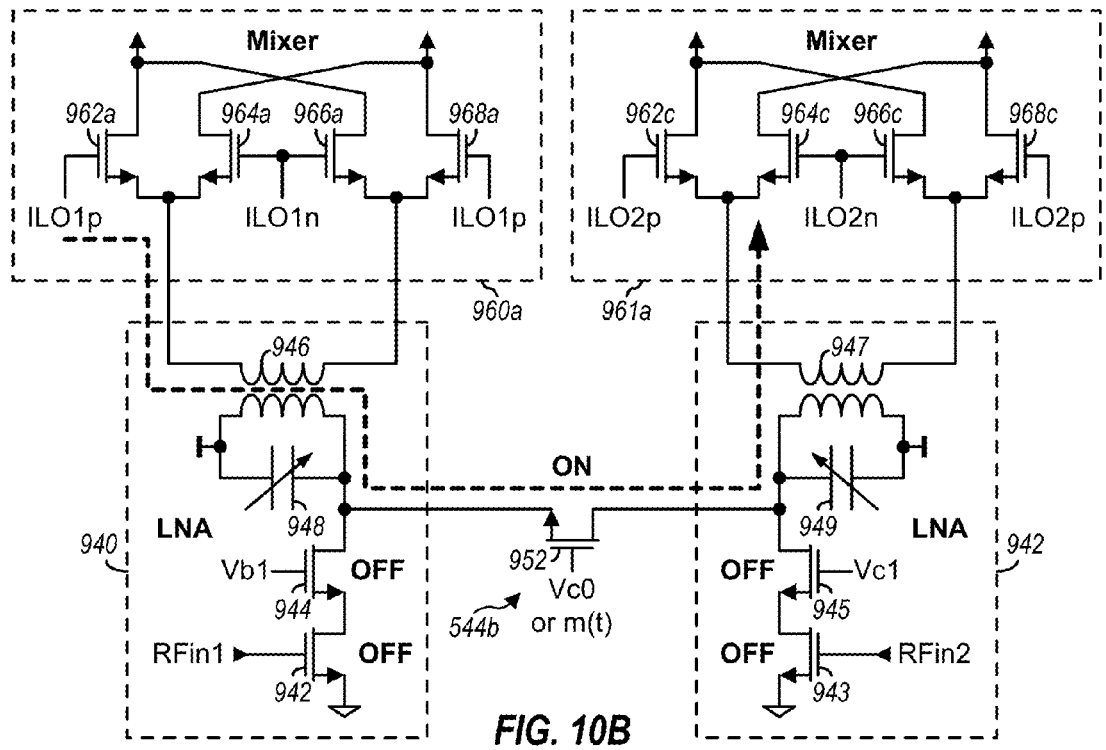

FIG. 10B shows an exemplary design of an interface circuit 544b. In this exemplary design, interface circuit 544b includes a transistor 952 operating as a switch and having its source coupled to the drain of cascode transistor 944, its gate receiving a Vc0 control signal or a modulation signal m(t), and its drain coupled to the drain of cascode transistor 945.

To generate a test signal for mixer 961a, gain transistors 942 and 943 and cascode transistors 944 and 945 may be turned OFF, and transistor 952 may be turned ON, as shown in FIG. 10B. An LO signal may be provided to the gate of transistor 962a within mixer 960a, passed through transformer 946 and transistor 952, and provided as a test signal by transformer 947 to mixer 961a. To generate a test signal for mixer 960a, gain transistors 942 and 943 and cascode transistors 944 and 945 may be turned OFF, and transistor 952 may be turned ON, as shown in FIG. 10B. An LO signal may be provided to the gate of transistor 962*c* within mixer 961*a*, passed through transformer 947 and transistor 952, and provided as a test signal by transformer 946 to mixer 960*a*.

Figure 10C:
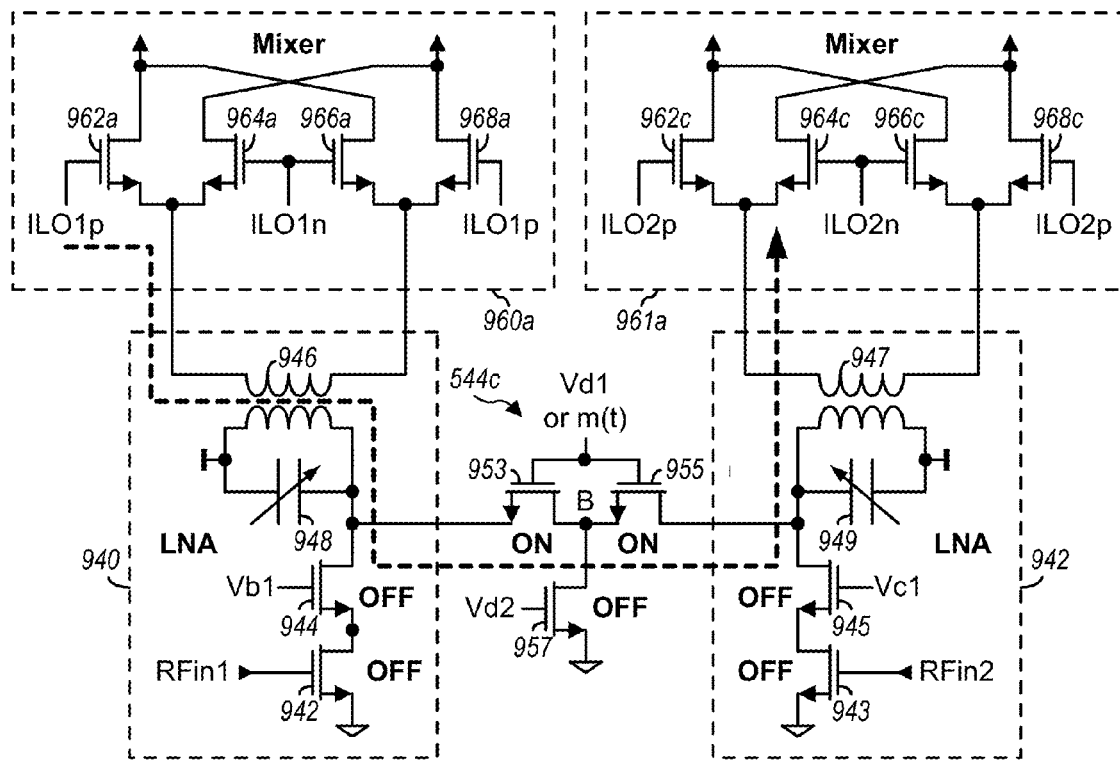

FIG. 10C shows an exemplary design of an interface circuit 544*c*. In this exemplary design, interface circuit 544*c* includes a T-switch implemented with series transistors 953 and 955 and a shunt transistor 957. Series transistor 953 has its source coupled to the drain of cascode transistor 944 within LNA 940, its gate receiving a Vd1 control signal, and its drain coupled to node B. Series transistor 955 has its source coupled to node B, its gate receiving the Vd1 control signal or a modulation signal m(t), and its drain coupled to the drain of cascode transistor 945 of LNA 942. Shunt transistor 957 has its source coupled to circuit ground, its gate receiving a Vd2 control signal, and its drain coupled to node B.

To generate a test signal for mixer 961*a*, gain transistors 942 and 943 and cascode transistors 944 and 945 may be turned OFF, series transistors 953 and 955 may be turned ON, and shunt transistor 957 may be turned OFF, as shown in FIG. 10C. An LO signal may be provided to the gate of transistor 962*a* within mixer 960*a*, passed through transformer 946 and transistors 953 and 955, and provided as a test signal by transformer 947 to mixer 961*a*. A test signal may be generated for mixer 960*a* in similar manner. In the RX mode, series transistors 953 and 955 may be turned OFF, and shunt transistor 957 may be turned ON. Node B may then be pulled to circuit ground, which may improve isolation between LNAs 940 and 942.

FIGS. 10A to 10C show three exemplary design of an interface circuit to provide an LO signal for calibration. An interface circuit may also be implemented in other manners. It may be desirable to implement interface circuit such that it degrades performance as little as possible in the RX mode.

Figure 11:
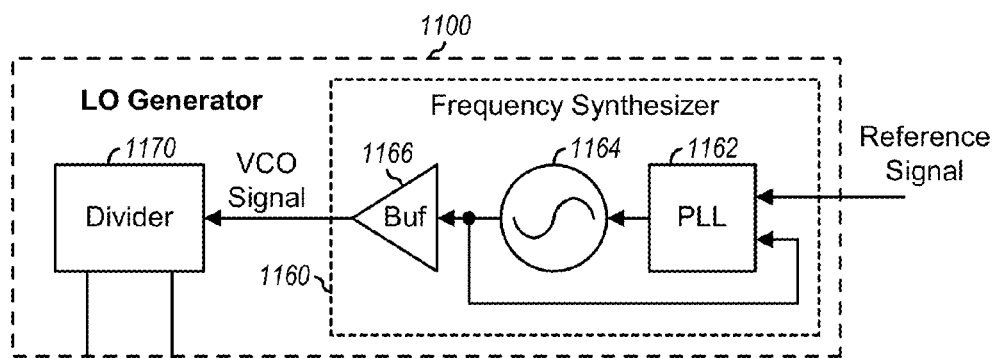
FIG. 11 shows an exemplary design of an LO generator.

FIG. 11 shows an exemplary design of an LO generator 1100, which may be used for any of the LO generators described herein. LO generator 1100 includes (i) a frequency synthesizer 1160 to generate a voltage-controlled oscillator (VCO) signal at a desired frequency and (ii) a divider 1170 to divide the VCO signal in frequency and provide an LO signal comprising an ILO signal and a QLO signal.

In the exemplary design shown in FIG. 11, frequency synthesizer 1160 includes a PLL 1162, a VCO 1164, and a buffer (Buf) 1166. VCO 1164 receives a control signal from PLL 1162 and generates an oscillator signal at a frequency determined by the control signal. PLL 1162 receive a reference signal and the oscillator signal from VCO 1164, compares the phase of the oscillator signal against the phase of the reference signal, and generates the control signal for VCO 1164 such that the phase of the oscillator signal is locked to the phase of the reference signal. Buffer 1166 receives the oscillator signal from VCO 1164 and provides the VCO signal to divider 1170. Divider 1170 divides the VCO signal in frequency by a factor of N, where N may be equal to 2, 3, 4, or some other value. Divider 1170 provides ILO and QLO signals. The ILO and QLO signals may each be a differential LO signal.

An LO generator for a first receiver (e.g., an inactive receiver) may be used to generate an LO signal for a second receiver being calibrated. This may be achieved in various manners. In one exemplary design, a direct current (DC) voltage may be applied to a mixer and upconverted by the LO signal from the LO generator to generate a test signal for the second receiver. For example, in FIG. 9, switches 972 and 976 within lowpass filter 970*a* may be opened, and a DC voltage may be provided at nodes N3 and N4. This DC voltage may be upconverted with the ILO1 signal by mixer 960*a* to generate a test signal for mixer 961*a* and/or 961*b*. The amplitude of the test signal may be dependent on the DC voltage, and a desired test signal amplitude may be obtained by varying the DC voltage. For example, a test signal within a range of −12 dBm to −30 dBm may be generated by varying the DC voltage from 0.2V to 1.0V. In one exemplary design, the DC voltage may be generated by connecting one input of lowpass filter 970*a* to a programmable common mode voltage (VCM) and the other input of lowpass filter 970*a* to circuit ground. An adjustable differential DC voltage may be obtained based on the programmable VCM. An adjustable DC voltage may also be generated in other manners to enable generation of a variable amplitude test signal.

In another exemplary design, a mixer may be reconfigurable to operate as either a mixer or an amplifier. For example, mixer 960*a* in FIG. 9 may further include two additional NMOS transistors. The first NMOS transistor may have its source coupled to node N3, is gate receiving a control signal, and its drain coupled to the VDD supply. The second NMOS transistor may have its source coupled to circuit ground, is gate receiving the control signal, and its drain coupled to node N4. Mixer 960*a* may be configured as mixer by turning OFF the two NMOS transistors. Mixer 960*a* may be reconfigured as an amplifier by turning ON the two NMOS transistors and turning OFF NMOS transistors 964*a* and 966*a*. In this case, the ILO1p signal may be amplified by the amplifier, and an amplified LO signal may be provided to nodes N3 and N4. The amplified LO signal may be used to generate a test signal.

Figure 12:
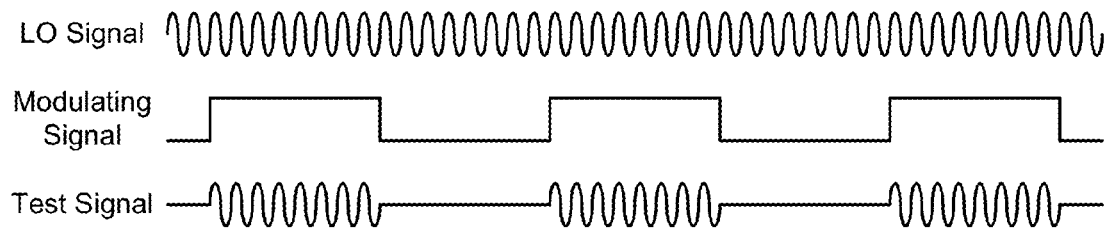
FIG. 12 shows generation of a test signal with amplitude modulation.

FIG. 12 shows an exemplary design of generation of a test signal by applying amplitude modulation (AM) on an LO signal. The LO signal may be a continuous signal at a particular frequency. A modulating signal m(t) may include a sequence of pulses and may be used to amplitude modulate the LO signal to generate a test signal having amplitude modulation. The test signal may be used to calibrate IIP2 and/or other performance metrics.

The modulating signal m(t) may be applied at various locations in a signal path from a first receiver generating the LO signal to a second receiver being calibrated. For example, the modulating signal may be applied to the gate of cascode transistor 944 and/or 950 in FIG. 10A, the gate of pass transistor 952 in FIG. 10B, or the gates of transistors 953 and 955 in FIG. 10C.

Using an LO generator for a first receiver (which is inactive) to generate a test signal for a second receiver (which is to be calibrated) may provide various advantages. First, the LO generator may be able to generate an LO signal for a frequency range of interest and with the desired frequency resolution and accuracy. This may enable calibration of the second receiver while it is active or inactive. For example, the LO generator may generate the LO signal (i) at a first frequency such that the resultant downconverted signal is within the system bandwidth for in-band calibration or (ii) at a second frequency such that the resultant downconverted signal is outside of the system bandwidth for out-of-band calibration. The LO generator may also generate the LO signal to hop in frequency, e.g., to match hopping of TX frequency to enable calibration of IIP2 at downconverted RX frequency. The RX frequency may be the same as the TX frequency for time division duplexing (TDD) or may be different from the TX frequency for frequency division duplexing (FDD).

In contrast, using a separate tone generator to generate the test signal may increase circuit complexity and cost. Furthermore, the tone generator may not have the required frequency range and/or the required accuracy without including additional circuitry and control.

Wireless device 110 may be required to meet stringent performance specifications and may be unable to meet these specifications without good RSB and good IIP2. For example, wireless device 110 may be required to meet peak throughput on the order of 300 megabits/seconds (Mbps) for 4×4 MIMO transmission and may require RSB of 45 decibels (dB) or better in order to meet the throughput requirements. RSB may be sensitive to temperature, frequency, etc. Calibration of receivers for RSB may be performed at the factory during manufacturing. However, receiver settings selected by the factory calibration for RSB may not provide the required RSB over temperature, frequency, etc.

Calibration of receivers for IIP2 may also be performed at the factory at one or more specific frequencies. However, wireless device 110 may transmit at a TX frequency that does not correspond to one of the frequencies at which IIP2 calibration has performed. In this case, there may be some performance degradation due to sub-optimal IIP2. Hence, it may be desirable or necessary to perform IIP2 calibration at an RX frequency corresponding to the TX frequency of wireless device 110.

In another aspect of the present disclosure, calibration of a receiver (e.g., for RSB and/or IIP2) may be performed while wireless device 110 is operational in order to obtain good performance for the receiver. Wireless device 110 may operate in a connected mode or an idle mode at any given moment. In the connected mode, wireless device 110 may transmit data to and/or receive data from one or more base stations. In the idle mode, wireless device 110 may periodically receive downlink signals from base stations during designated time periods and may sleep during the remaining time in order to conserve battery power.

In an exemplary design, wireless device 110 may perform calibration in the idle mode during time periods in which it is not receiving downlink signals. In another exemplary design, wireless device 110 may perform calibration for a receiver in the connected mode during time periods when the receiver is not used for downlink reception. For example, in a wireless system utilizing TDD, wireless device 110 may transmit data in uplink subframes and receive data in downlink subframes. Wireless device 110 may calibrate a receiver during uplink subframes. In yet another exemplary design that is applicable for both the idle mode and connected mode, wireless device 110 may perform calibration for a receiver during downlink reception by using a test signal that is placed outside of a system bandwidth.

Figure 13:
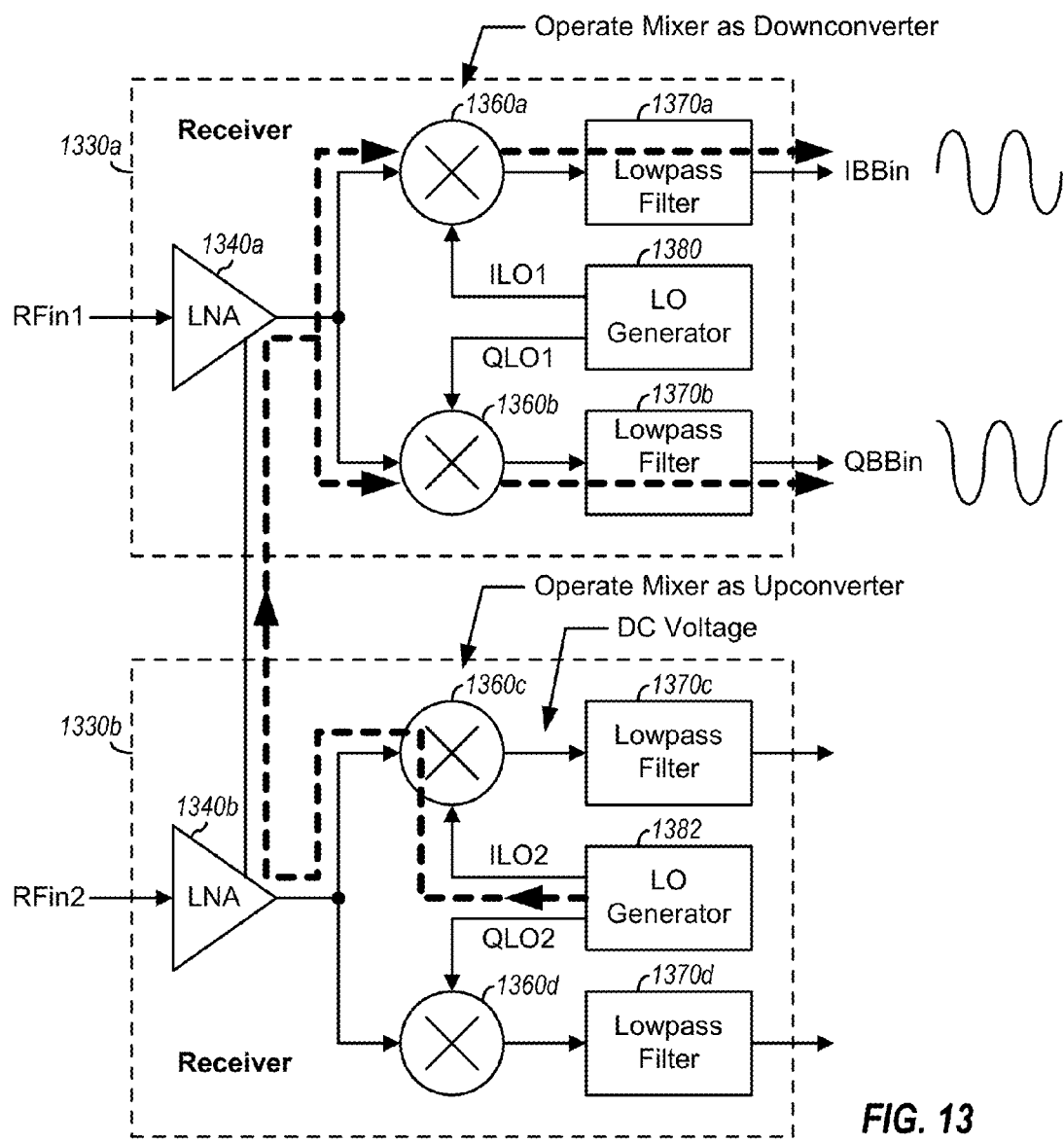
FIG. 13 shows calibration of one receiver with a test signal from another receiver.

FIG. 13 shows an exemplary configuration for calibrating a first receiver 1330a with a test signal generated by a second receiver 1330b. Receiver 1330b may be inactive and may be used to generate the test signal at a desired frequency for receiver 1330a. An LO generator 1380 for receiver 1330a may generate a first LO signal at a desired frequency of $f_{LO1}$. An LO generator 1382 for receiver 1330b may generate a second LO signal at a frequency of $f_{LO2}$. The second LO signal may be used to generate a test signal for receiver 1330a. The test signal may be applied at the input of an LNA 1340a for receiver 1330a (not shown in FIG. 13) or may be applied at some other node within receiver 1330a. In any case, the test signal may be downconverted by a mixer 1360a with an ILO1 signal from LO generator 1380 and filtered by a lowpass filter 1370a to obtain an I input baseband signal (IBBin). The test signal may also be downconverted by a mixer 1360b with a QLO1 signal from LO generator 1380 and filtered by a lowpass filter 1370b to obtain a Q input baseband signal (QBBin). The ILO1 signal and the QLO1 signal are part of the first LO signal generated by LO generator 1380 for receiver 1330a. The IBBin and QBBin signals form a complex BBin signal provided by receiver 1330a to a data processor.

Figure 14A:
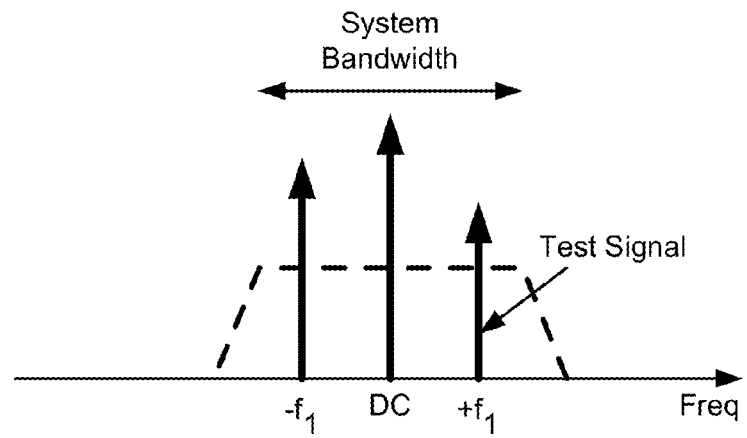
FIGS. 14A to 14C show three ways of generating a test signal for calibration.

FIG. 14A shows a frequency response of the BBin signal from receiver 1330a in FIG. 13 for a case in which the test signal is placed in-band. In particular, the frequency $f_{LO2}$ of the second LO signal from receiver 1330b may be offset from the frequency $f_{LO1}$ of the first LO signal in receiver 1330a by less than one half of the system bandwidth (BW), or $f_1 = |f_{LO2} - f_{LO1}| < BW/2$. This would then result in the BBin signal including a single tone at a frequency of $f_1$, which is within the system bandwidth, as shown in FIG. 14A.

The BBin signal may be expressed as:

$$BBin(t) = I(t) + jQ(t) = \cos(2\pi f_1 t) + j*k*\sin(2\pi f_1 t + \theta), \quad \text{Eq(1)}$$

where I(t) denotes the IBBin signal and Q(t) denotes the QBBin signal,

BBin(t) denotes the complex BBin signal, k is a gain error between the I and Q signal paths of receiver 1330a, and θ is a phase error between the I and Q signal paths of receiver 1330a.

The gain error k and the phase error θ may be determined as follows:

$$k = \Sigma |I^2(t) - Q^2(t)|, \text{ and} \quad \text{Eq(2)}$$

$$\theta = \text{correlate}\{I(t) \text{ and } Q(t)\}. \quad \text{Eq(3)}$$

The gain error and phase error may be determined in the analog domain using appropriate circuits. Alternatively, the gain error and phase error may be computed in the digital domain by performing computation on I and Q samples, which may be obtained by digitalizing the IBBin and QBBin signals. The gain error and phase error may be dependent on frequency and may be computed for different frequencies of interest.

Figure 14B:
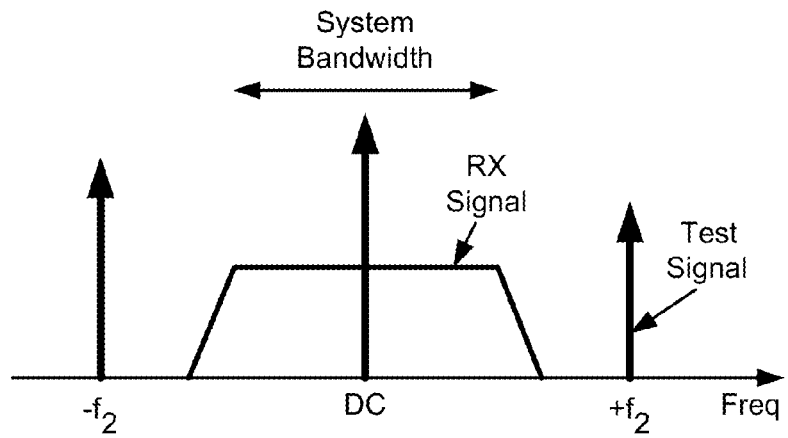

FIG. 14B shows a frequency response of the BBin signal from receiver 1330a in FIG. 13 for a case in which the test signal is placed out-of-band. In particular, the frequency $f_{LO2}$ of the second LO signal in receiver 1330b may be offset from the frequency $f_{LO1}$ of the first LO signal in receiver 1330a by more than one half of the system bandwidth (BW), or $f_2 = |f_{LO2} - f_{LO1}| > BW/2$. This would then result in the BBin signal including a single tone at a frequency of $f_2$, which is outside of the system bandwidth, as shown in FIG. 14B. This configuration may be used to calibrate receiver 1330a while it is receiving a downlink signal.

Figure 14C:
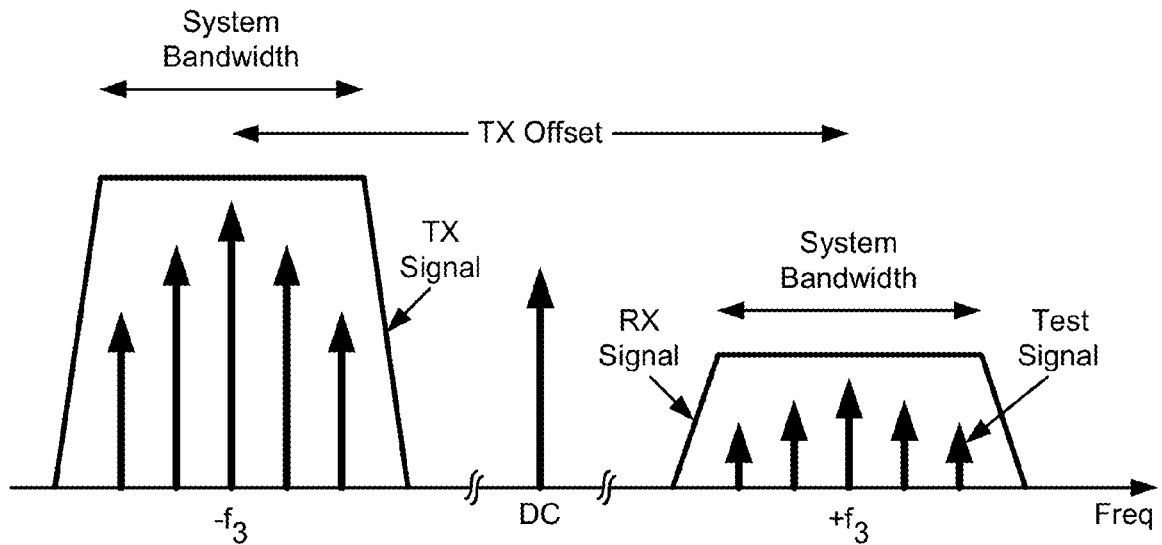

FIG. 14C shows a frequency response of the BBin signal from receiver 1330a in FIG. 13 for a case in which an AM modulated test signal is used for calibration. The frequency $f_{LO2}$ of the second LO signal in receiver 1330b may be offset from the frequency $f_{LO1}$ of the first LO signal in receiver 1330a by a TX offset, which is the difference between a TX frequency and an RX frequency. The second LO signal may hop in frequency such that the BBin signal includes downconverted tones at different frequencies within the system bandwidth, as shown in FIG. 14C.

In an exemplary design, calibration may be performed at different frequencies in different band groups. For example, calibration may be performed for four sub-bands in low band, four sub-bands in mid band, and two sub-bands in high band. Calibration may also be performed for three frequencies in each sub-band in low band, three frequencies in each sub-band in mid band, and two frequencies in each sub-band in high band. Calibration may thus be performed for (3*4+3*4+4*2)=32 frequencies in this example. Calibration may also be performed for fewer or more frequencies.

Wireless device 110 may be required to meet stringent specifications for receive path gain, e.g., to meet gain accuracy to within ±1 dB. Receive path gain may be defined as a gain of a receive path. A receive path may cover all or a portion a signal path from an antenna to an analog-to-digital converter (ADC). A receive path may cover a signal path in a receiver and possibly a signal path in a front-end prior to an LNA in the receiver. Wireless device 110 may have a complex front-end in order to support multiple bands, multiple radio technologies, multiple antennas, etc. Due to the complex front-end, calibration for receive path gain should include the front-end circuit in order to ensure that the required specifications for receive path gain can be met.

A wireless device may include a number of receive paths and a number of gain modes. Each gain mode of a receive path may be associated with a particular gain for the receive path. Conventionally, the stringent specifications for receive path gain may be achieved by using an external test equipment to inject a calibration/tone signal into the wireless device to calibrate each receive path and each gain mode of interest. The wireless device may include a large number of receive paths and/or a large number of gain modes. An extensive amount of time may then be required to calibrate different receive paths and different gain modes, which may increase complexity and cost.

In yet another aspect of the present disclosure, the gain of a receive path may be measured based on a test signal generated by another receiver. The test signal may be injected at various points in the receive path. The power or amplitude of the test signal may be measured to determine the gain of the receive path.

In an exemplary design, a feedback receiver for a transmitter may be used to generate a test signal to measure receive path gain. Referring back to FIG. 8, receiver 830c may be a feedback receiver for transmitter 832. Feedback receiver 830c may be coupled to antenna 810 via directional coupler 822. Feedback receiver 830c may be reused for receive path gain calibration, so that little or no additional hardware may be required for receive path gain calibration. Feedback receiver 830c may generate a test signal and provide the test signal to coupler 822. The test signal may be passed through front-end circuit 820 and provided to a receive path to be calibrated.

In the example shown in FIG. 8, the gains of various signal paths may be defined as follows:
G1=gain from node B to node C,
G2=gain from node B to node D,
L1=gain from node X to node B, and
L2=gain from node A to node B.
G1, G2, L1 and L2 may be given in units of dB.

A test signal may be generated by feedback receiver 830c and used to measure the receive path gain of different receive paths. The power of the test signal at different nodes may be expressed as:

$$P1 = P_{test} + L1 + G1, \quad \text{Eq(4)}$$

$$P2 = P_{test} + L1 + G2, \text{ and} \quad \text{Eq(5)}$$

$$\Delta P = P1 - P2 = G1 - G2, \quad \text{Eq(6)}$$

where $P_{test}$ is the power of the test signal at node X,
P1 is the power of the test signal at node C,
P2 is the power of the test signal at node D, and
ΔP is a delta gain between two receive paths at nodes C and D.
$P_{test}$, P1 and P2 may be given in units of dBm. ΔP may be given in units of dB.

In the exemplary design shown in equation (6), receiver 830a is used as a reference. Power P2 at node D may be subtracted from power P1 at node C to obtain the delta gain ΔP between the two receive paths for receivers 830a and 830b. Because the delta gain ΔP between the two receive paths is of interest, the absolute power level of the test signal is not important since it will be removed when the delta gain is computed. Furthermore, an absolute loss of coupler 822 is not important since this loss will also be removed when the delta gain is computed.

A calibration/tone signal may be generated by an external test equipment and applied to an antenna connector at node A. The power of the calibration signal at node C may be expressed as:

$$P_{ref1} = P_{in} + L2 + G1, \quad \text{Eq(7)}$$

where $P_{in}$ is the power of the calibration signal from the test equipment at node A, and
$P_{ref1}$ is the power of the calibration signal at node C.

The gains of different receive paths may be computed based on the power levels of the calibration signal at nodes A and C and the delta gain, as follows:

$$A1 = P_{in} - P_{ref1} = L2 + G1, \text{ and} \quad \text{Eq(8)}$$

$$A2 = A1 - \Delta P, \quad \text{Eq(9)}$$

where A1 is the gain of the receive path from node A to node C, and
A2 is the gain of the receive path from node A to node D.

An absolute power measurement may be made at the factory to obtain $P_{ref1}$. All other measurements may be made at any convenient time, so that test time for receive path gain calibration can be reduced, which may reduce overall test time and cost.

Circuits in a wireless device may have a response that varies across frequency. For example, coupler 822 may have a frequency response that may be well behaved and may thus be pre-characterized. A transformer or balun (not shown in FIG. 8) may be used to interface LNA 840c with coupler 822 and may also have a well-behaved frequency response that may be pre-characterized. Circuits used to generate a test signal may also have a well-behaved frequency response that may be pre-characterized. An overall frequency response may be obtained based on the frequency responses of all circuits. A look-up table may store relative gains corresponding to gains at different frequencies relative to one or more gains at one or more reference frequencies.

Several absolute power measurements may be made (e.g., with a test equipment) for a reference receive path at different frequencies. Absolute power measurements for the reference receive path at other frequencies may be obtained (e.g., interpolated) based on the absolute power measurements made for the reference receive path as well as a pre-characterized frequency response of the reference receive path. Power measurements for other receive paths at different frequencies and for different gain modes may be made based on a test signal (e.g., from feedback receiver 830c). Absolute gains may be determined for different receive paths and different gain modes based on the power measurements with the test signal and the absolute power measurements made for the reference signal path. Receive gain calibration using internally generated test signal may greatly reduce the number of absolute power measurements needed to determine receive path gains for all receive paths, gain modes, and frequencies of interest.

In general, receive gain calibration may be performed at any time. In an exemplary design, receive gain calibration may be performed during manufacturing, e.g., concurrent with other RF tests (e.g., for RSB) so that additional test time is not used just for receive gain calibration. In another exemplary design, receive gain calibration may be performed during operation of a wireless device. For example, receive gain calibration may be performed during a sleep-wake up cycle of the wireless device, e.g., to remove temperature-dependent factors such as temperature drifts associated with receive circuits.

FIG. 8 shows an exemplary design in which a test signal is provided at a directional coupler and used to determine receive path gain. The directional coupler may be placed next to an antenna, as shown in FIG. 8. In general, a test signal may be provided at any point in a signal path from an antenna to an ADC. For example, a test signal may be provided between diplexer 824 and duplexer 826 or 828, or at the input of LNA 840a or 840b, etc. A test signal may be applied via a directional coupler, or a switch (e.g., a single-pole double throw (SPDT) switch), or some other circuit. A gain may be measured for all circuits via which a test signal travels through.

FIG. 8 shows an exemplary design of a front-end circuit. In general, a front-end circuit may include various circuits such as duplexers, diplexers, switches, filters, couplers, etc. The circuits in a front-end circuit may be arranged differently than the exemplary configuration shown in FIG. 8.

FIG. 8 shows an exemplary design of generating a test signal for receive gain calibration based on feedback receiver 830c. In general, a test signal for receive gain calibration may be generated by any circuit. For example, the test signal may be generated by a receiver that is not under test, a transmitter, a test signal generator designed to generate the test signal, etc. A test signal may be generated by upconverting a DC voltage via a mixer or based on some other technique.

In an exemplary design, an apparatus (e.g., a wireless device, an IC, a circuit module, etc.) may include first and second LO generators. The first LO generator (e.g., LO generator 580 in FIGS. 5 to 6C) may generate a first LO signal used by a first receiver (e.g., receiver 530) for frequency downconversion. The second LO generator (e.g., LO generator 582) may generate a second LO signal used by a second receiver (e.g., receiver 532) for frequency downconversion in a first operating mode (e.g., an RX mode). The second LO signal may be used to generate a test signal for the first receiver in a second operating mode (e.g., a calibration mode). The first LO signal may also be used to generate a second test signal for the second receiver in the second operating mode. The test signal for the first receiver may be generated in a first configuration of the second operating mode, and the second test signal for the second receiver may be generated in a second configuration of the second operating mode.

In an exemplary design, the first receiver (e.g., receiver 732a in FIG. 7B) may perform frequency downconversion for a first set of at least one carrier, and the second receiver (e.g., receiver 732b in FIG. 7B) may perform frequency downconversion for a second set of at least one carrier for carrier aggregation, e.g., as shown in FIGS. 7B and 7C. In another exemplary design, the second receiver (e.g., receiver 830c in FIG. 8) may be a feedback receiver for a transmitter, and the second LO signal may be provided via a front-end circuit to the first receiver (e.g., receiver 830a in FIG. 8). In general, the first and second receivers may be any two receivers in a wireless device and may reside on the same IC chip or different IC chips.

In an exemplary design, a switch may be used to pass the test signal from one receiver to another receiver. In an exemplary design, the switch may simply be closed to pass the second LO signal as the test signal. In another exemplary design, the switch may receive a modulating signal and the second LO signal and may provide the test signal having amplitude modulation based on the modulating signal.

In an exemplary design, the apparatus may further include first and second LNAs and a switch. The first LNA (e.g., LNA 740 in FIG. 7A or LNA 940 in FIGS. 10A-10C) may receive a first input RF signal and provide a first amplified RF signal to the first receiver. The second LNA (e.g., LNA 741 in FIG. 7A or LNA 942 in FIGS. 10A-10C) may receive a second input RF signal and provide a second amplified RF signal to the second receiver. The switch may be coupled between the first and second LNAs and may pass the test signal in the second operating mode.

In an exemplary design, the switch may comprise a transistor (e.g., transistor 758 in FIG. 7A, transistor 950 in FIG. 10A, or transistor 952 in FIG. 10B) coupled between the first LNA for the first receiver and the second LNA for the second receiver. In another exemplary design, the switch may comprise three transistors. A first transistor (e.g., transistor 953 in FIG. 10C) may be coupled between the first LNA and an intermediate node. A second transistor (e.g., transistor 955) may be coupled between the intermediate node and the second LNA. A third transistor (e.g., transistor 957) may be coupled between the intermediate node and circuit ground.

In another exemplary design, the apparatus may further include a SIMO LNA (e.g., SIMO LNA 742 in FIG. 7B) comprising a gain circuit and first and second cascode transistors. The gain circuit (e.g., gain circuit 752a) may receive and amplify an input RF signal. The first cascode transistor (e.g., cascode transistor 754a) may be coupled to the gain circuit and may provide a first amplified RF signal to the first receiver. The second cascode transistor (e.g., cascode transistor 754b) may be coupled to the gain circuit and may provide a second amplified RF signal to the second receiver. The first and second cascode transistors may be turned ON to pass the test signal to the first receiver in the second operating mode, e.g., as shown in FIG. 7B.

In yet another exemplary design, the apparatus may further include a MIMO LNA (e.g., MIMO LNA 744 in FIG. 7C) comprising the gain circuit and the first and second cascode transistors described above for the SIMO LNA as well as a second gain circuit and third and fourth cascode transistors. The second gain circuit (e.g., gain circuit 752b in FIG. 7C) may receive and amplify a second input RF signal. The third cascode transistor (e.g., cascode transistor 754c) may be coupled to the second gain circuit and may provide a third amplified RF signal to the first receiver. The fourth cascode transistor (e.g., cascode transistor 754d) may be coupled to the second gain circuit and may provide a fourth amplified RF signal to the second receiver.

In an exemplary design, the second receiver may comprise a mixer (e.g., mixer 1360c in FIG. 13). The mixer may downconvert an input RF signal with the second LO signal in the first operating mode. The mixer may upconvert a DC voltage with the second LO signal in the second operating mode to obtain an intermediate LO signal, which may be used to generate the test signal. The DC voltage may be varied to obtain an adjustable amplitude for the test signal.

The first LO generator may generate the first LO signal at a first frequency, and the second LO generator may generate the second LO signal at a second frequency. In an exemplary design, the second frequency may be less than one half of a system bandwidth from the first frequency, e.g., as shown in FIG. 14A. In another exemplary design, the second frequency may be more than one half of the system bandwidth from the first frequency, e.g., as shown in FIG. 14B. In this exemplary design, signal reception and calibration may be performed concurrently, and the first and second operating modes may be selected concurrently. In yet another exemplary design, the second LO generator may generate the second LO signal at a plurality of frequencies (e.g., with frequency hopping) to obtain the test signal at the plurality of frequencies, e.g., as shown in FIG. 14C.

The second LO signal may be used to generate the test signal when the second receiver is inactive. In an exemplary design, the second LO signal may be used to generate the test signal for calibration of the first receiver when the apparatus is operating in an idle mode. The second receiver may be periodically active only during certain time periods to receive signals in the idle mode. Calibration may be performed during the remaining time when the second receiver is not active. In another exemplary design, the second LO signal may be used to generate the test signal for calibration of the first receiver when the apparatus is operating in a connected mode. For example, the test signal may be generated outside of the signal bandwidth (e.g., as shown in FIG. 14B), which may allow calibration to be performed concurrently with signal reception. Alternatively, for TDD, calibration of the second receiver may be performed during uplink time intervals when the apparatus is transmitting on the uplink.

Figure 15:
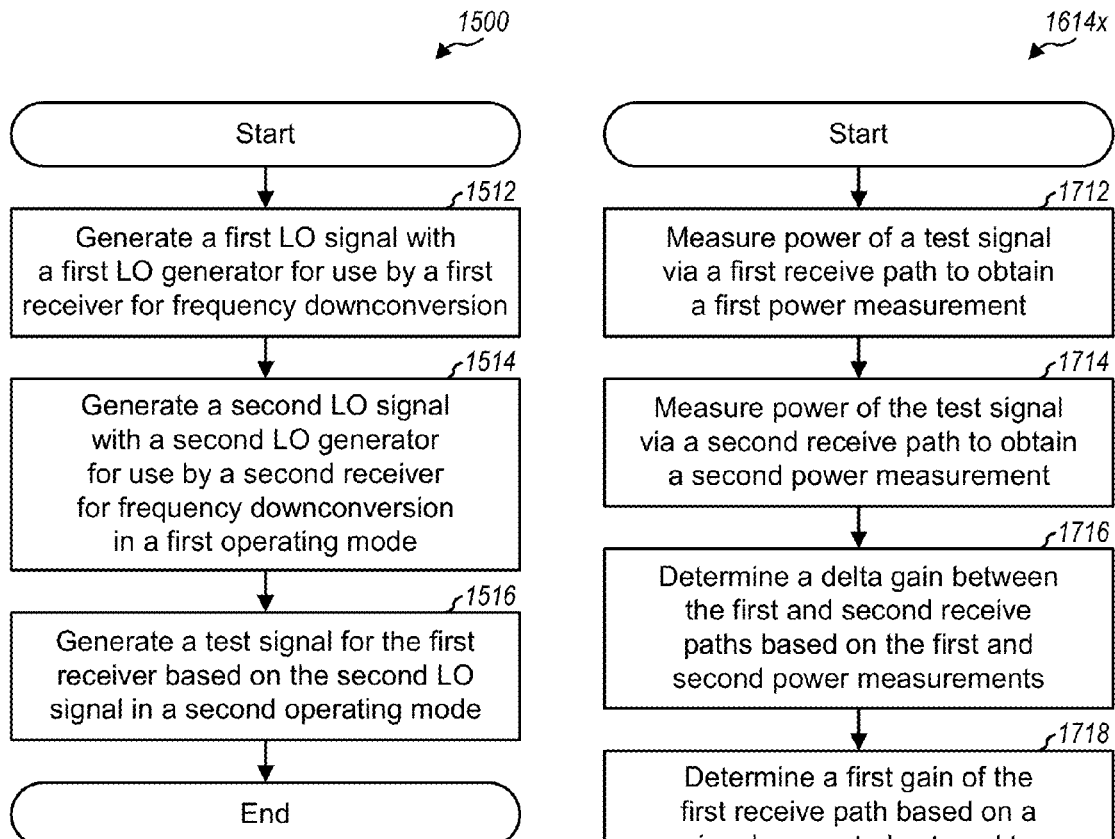
FIG. 15 shows a process for performing calibration.

FIG. 15 shows an exemplary design of a process 1500 for performing calibration. A first LO signal may be generated with a first LO generator and may be used by a first receiver for frequency downconversion (block 1512). A second LO signal may be generated with a second LO generator and may be used by a second receiver for frequency downconversion in a first operating mode (block 1514). A test signal for the first receiver may be generated based on the second LO signal in a second operating mode (block 1516). The test signal may comprise the second LO signal without any modulation or may be generated by amplitude modulating the second LO signal with a modulating signal.

In another exemplary design, an apparatus (e.g., a wireless device, an IC, a circuit module, etc.) may include an LO generator, a front-end circuit, and a receiver. The LO generator (e.g., LO generator 882 in FIG. 8) may generate an LO signal used to obtain a test signal. The front-end circuit (e.g., front-end circuit 820) may receive the test signal and a received RF signal and provide an input RF signal, which may be generated based on the received RF signal and may comprise the test signal. The receiver (e.g., receiver 830a) may be coupled to the front-end circuit and may receive the input RF signal. A receive path may be formed based on the front-end circuit and the receiver may have a gain determined based on the test signal. The LO signal may be used by another receiver (e.g., receiver 830c) for frequency downconversion in a first operating mode and may be used to generate the test signal in a second operating mode.

In an exemplary design, the front-end circuit may include a directional coupler (e.g., directional coupler 822 in FIG. 8). The directional coupler may have a first port receiving the received RF signal, a second port receiving the test signal, and a third port providing a coupled RF signal. The input RF signal may be generated based on the coupled RF signal. The front-end circuit may also include other circuits such as diplexers, duplexers, switches, filters, matching circuits, etc.

The apparatus may further include a second receiver (e.g., receiver 830b). The second receiver may be coupled to the front-end circuit and may receive a second input RF signal, which may be generated based on the received RF signal and may comprise the test signal. A second receive path may be formed based on the front-end circuit and the second receiver and may have a second gain determined based on the test signal.

Figure 16:
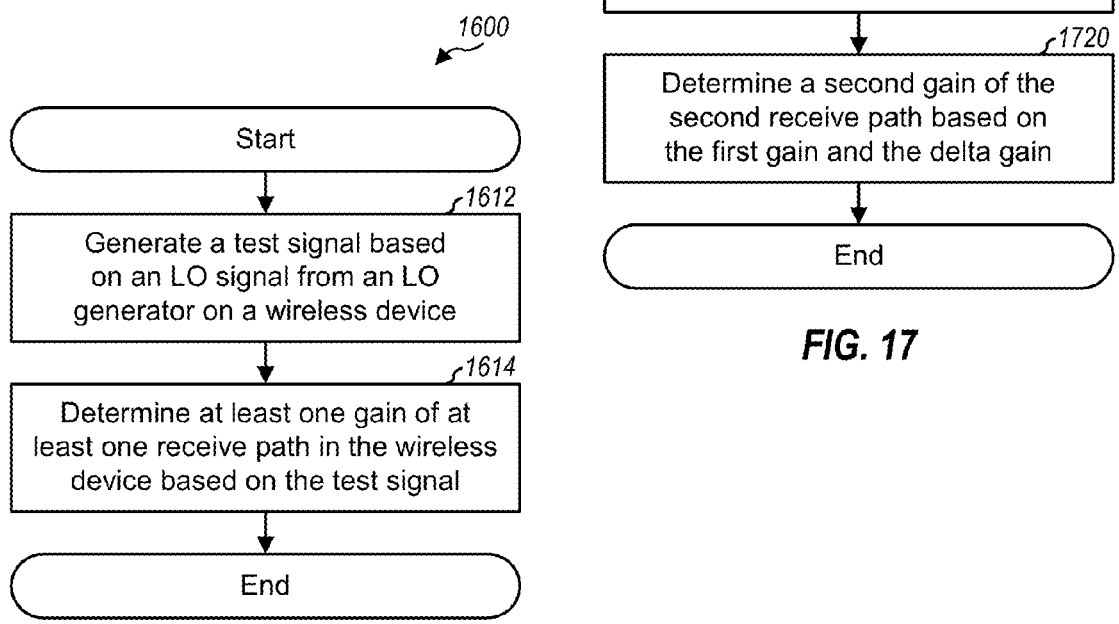

FIG. 16 shows an exemplary design of a process 1600 for determining receive path gain. A test signal may be generated based on an LO signal from an LO generator on a wireless device (block 1612). The LO generator may generate the LO signal for frequency conversion by a receiver and/or a transmitter. The LO generator may also be used only for calibration of the wireless device. At least one gain of at least one receive path in the wireless device may be determined based on the test signal (block 1614).

In an exemplary design, the test signal may be applied to a front-end circuit of the wireless device. Each of the at least one receive path may then comprise at least part of the front-end circuit. Each receive path may further comprise an LNA and all or part of a receiver, e.g., as shown in FIG. 8.

Figure 17:
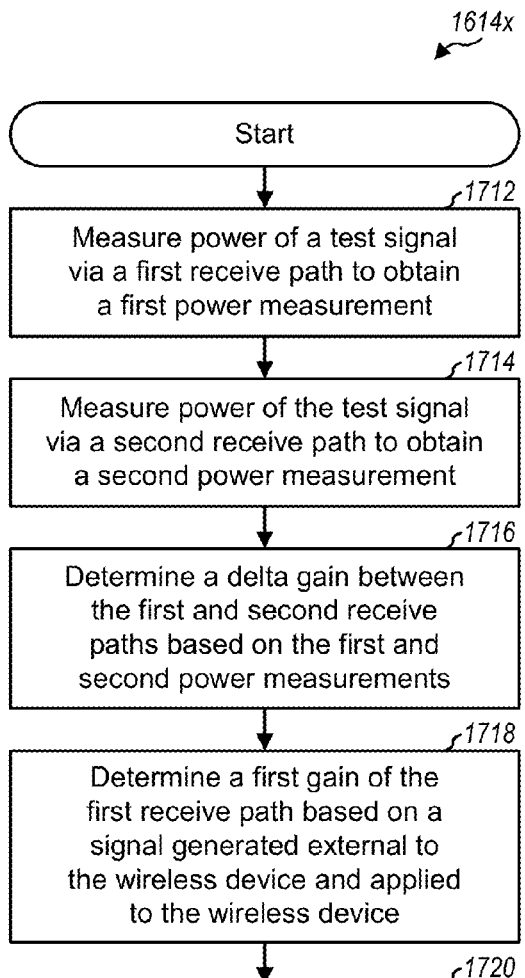
FIGS. 16 and 17 show processes for determining receive path gain.

FIG. 17 shows an exemplary design of a process 1614x for determining at least one gain of at least one receive path. Process 1614x may be used for block 1614 in FIG. 16. Gain may be determined for at least one receive path, which may comprise a first receive path and a second receive path. The power of a test signal via the first receive path may be measured to obtain a first power measurement (block 1712). The power of the test signal via the second receive path may also be measured to obtain a second power measurement (block 1714). A delta gain between the first and second receive paths may be determined based on the first and second power measurements, e.g., as shown in equation (6) (block 1716). A first gain (e.g., an absolute gain) of the first receive path may be determined based on a signal generated external to the wireless device and applied to the wireless device (block 1718). A second gain of the second receive path may be determined based on the first gain and the delta gain, e.g., as shown in equation (9) (block 1720).

In an exemplary design, the first gain of the first receive path may be determined at a plurality of frequencies based on the signal generated external to the wireless device. The delta gain between the first and second receive paths may also be determined at the plurality of frequencies based on the test signal. The second gain of the second receive path at the plurality of frequencies may be determined based on the first gain of the first receive path and the delta gain at the plurality of frequencies.

In an exemplary design, information indicative of variation in a gain of a receive path across frequency may be pre-characterized and stored, e.g., in a look-up table. The gain of the receive path at at least one frequency may be determined based on a signal generated external to the wireless device. The gain of the receive path at one or more additional frequencies may be determined based on the gain of the receive path at the at least one frequency and the stored information.

The circuits (e.g., LO generators, LNAs, mixers, filters, switches, etc.) described herein may be implemented on an IC, an analog IC, an RFIC, a mixed-signal IC, an ASIC, a printed circuit board (PCB), an electronic device, etc. The circuits may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuits described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   a first local oscillator (LO) generator configurable to generate a first LO signal used by a first receiver for frequency downconversion; and
   a second LO generator configurable to generate a second LO signal used by a second receiver for frequency downconversion in a first operating mode and used to generate a test signal for the first receiver in a second operating mode, the test signal coupled to the first receiver exclusive of an antenna.

2. The apparatus of claim 1, the second LO generator configurable to generate the second LO signal used to generate the test signal for the first receiver in a first configuration of the second operating mode, and the first LO generator configurable to generate the first LO signal used to generate a second test signal for the second receiver in a second configuration of the second operating mode.

3. The apparatus of claim 1, the first receiver configurable to perform frequency downconversion for a first set of at least one carrier, and the second receiver configurable to perform frequency downconversion for a second set of at least one carrier.

4. The apparatus of claim 1, the second receiver being a feedback receiver for a transmitter, and the second LO signal being provided via a front-end circuit to the first receiver.

5. The apparatus of claim 1, further comprising:
   a switch configurable to receive a modulating signal and the second LO signal and to provide the test signal having amplitude modulation based on the modulating signal.

6. The apparatus of claim 1, further comprising:
   a first low noise amplifier (LNA) configurable to receive a first input radio frequency (RF) signal and provide a first amplified RF signal to the first receiver;
   a second LNA configurable to receive a second input RF signal and provide a second amplified RF signal to the second receiver; and
   a switch coupled between the first and second LNAs and configurable to pass the test signal in the second operating mode.

7. The apparatus of claim 6, the switch comprising:
   a transistor coupled between the first and second LNAs.

8. The apparatus of claim 6, the switch comprising:
   a first transistor coupled between the first LNA and an intermediate node;
   a second transistor coupled between the intermediate node and the second LNA; and
   a third transistor coupled between the intermediate node and circuit ground.

9. The apparatus of claim 1, further comprising:
   a low noise amplifier (LNA) comprising:
   a gain circuit configurable to receive and amplify an input radio frequency (RF) signal;
   a first cascode transistor coupled to the gain circuit and configurable to provide a first amplified RF signal to the first receiver; and
   a second cascode transistor coupled to the gain circuit and configurable to provide a second amplified RF signal to the second receiver, the first and second cascode transistors being turned ON to pass the test signal to the first receiver in the second operating mode.

10. The apparatus of claim 9, the LNA further comprising:
    a second gain circuit configurable to receive and amplify a second input RF signal;
    a third cascode transistor coupled to the second gain circuit and configurable to provide a third amplified RF signal to the first receiver; and
    a fourth cascode transistor coupled to the second gain circuit and configurable to provide a fourth amplified RF signal to the second receiver.

11. The apparatus of claim 1, the second receiver comprising:
    a mixer configurable to downconvert an input radio frequency (RF) signal with the second LO signal in the first operating mode and to upconvert a direct current (DC) voltage with the second LO signal in the second operating mode to obtain an intermediate LO signal used to generate the test signal.

12. The apparatus of claim 1, the first LO generator configurable to generate the first LO signal at a first frequency, and the second LO generator configurable to generate the second LO signal at a second frequency that is less than one half of a system bandwidth from the first frequency.

13. The apparatus of claim 1, the first LO generator configurable to generate the first LO signal at a first frequency, and the second LO generator configurable to generate the second LO signal at a second frequency that is more than one half of a system bandwidth from the first frequency.

14. The apparatus of claim 1, the second LO generator configurable to generate the second LO signal at a plurality of frequencies to obtain the test signal at the plurality of frequencies.

15. A method comprising:
- generating a first local oscillator (LO) signal with a first LO generator for use by a first receiver for frequency downconversion;
- generating a second LO signal with a second LO generator for use by a second receiver for frequency downconversion in a first operating mode; and
- generating a test signal for the first receiver based on the second LO signal in a second operating mode, the test signal coupled to the first receiver exclusive of an antenna.

16. The method of claim 15, the generating the test signal comprises generating the test signal by amplitude modulating the second LO signal with a modulating signal.

17. The method of claim 15, the generating the test signal comprises generating the test signal during an idle mode of a wireless device.

18. An apparatus comprising:
- means for generating a first local oscillator (LO) signal for use by a first receiver for frequency downconversion;
- means for generating a second LO signal for use by a second receiver for frequency downconversion in a first operating mode; and
- means for generating a test signal for the first receiver based on the second LO signal in a second operating mode, the test signal coupled to the first receiver exclusive of an antenna.

19. The apparatus of claim 18, the means for generating the test signal comprises means for generating the test signal by amplitude modulating the second LO signal with a modulating signal.

* * * * *